(12) United States Patent
Lawrence

(10) Patent No.: US 10,762,397 B1
(45) Date of Patent: Sep. 1, 2020

(54) COMPUTER ARCHITECTURE FOR EMULATING IMAGE MAPPING IN A CORRELITHM OBJECT PROCESSING SYSTEM

(71) Applicant: Bank of America Corporation, Charlotte, NC (US)

(72) Inventor: Patrick N. Lawrence, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 267 days.

(21) Appl. No.: 16/017,654

(22) Filed: Jun. 25, 2018

(51) Int. Cl.
G06K 9/62 (2006.01)

(52) U.S. Cl.
CPC ......... *G06K 9/6276* (2013.01); *G06K 9/6215* (2013.01)

(58) Field of Classification Search
CPC .... G06F 16/58; G06F 16/902; G06F 9/45504; G06F 9/45508; G06N 20/20; G06N 5/022; G06N 7/06; G06Q 10/00
See application file for complete search history.

(56) References Cited

U.S. PATENT DOCUMENTS

| | | | |
|---|---|---|---|
| 5,946,673 A | 8/1999 | Francone et al. | |
| 6,167,391 A | 12/2000 | Lawrence | |
| 6,941,287 B1 | 9/2005 | Vaidyanathan et al. | |
| 6,943,686 B2 | 9/2005 | Allen | |
| 6,947,913 B1 * | 9/2005 | Lawrence | G06N 20/00 706/14 |
| 7,015,835 B2 * | 3/2006 | Lawrence | H03M 7/00 341/50 |
| 7,031,969 B2 | 4/2006 | Lawrence et al. | |
| 7,246,129 B2 | 7/2007 | Lawrence et al. | |
| 7,310,622 B2 | 12/2007 | Lawrence et al. | |
| 7,349,928 B2 | 3/2008 | Lawrence et al. | |

OTHER PUBLICATIONS

U.S. Appl. No. 16/017,729, titled "Computer Architecture for Emulating a Foveal Mechanism in a Correlithm Object Processing System," by Patrick N. Lawrence, filed Jun. 25, 2018.
Meersman, R. et al., "On the Move to Meaningful Internet Systems 2005: CoopIS, DOA and ODBASE," OTM Confederated International Conferences CoopIS, DOA and ODBASE Oct. 2005 Agia Napa, Cyprus, Proceedings, Part I, Oct. 31-Nov. 4, 2005, pp. 763-779.
Lawrence, P. N., "Correlithm Object Technology," Apr. 2004, 229 pages.

* cited by examiner

*Primary Examiner* — Manuchehr Rahmjoo
(74) *Attorney, Agent, or Firm* — Michael A. Springs

(57) ABSTRACT

A device configured to emulate image mapping in a correlithm object processing system comprises a memory and one or more processors. The memory stores a correlithm object mapping table configured with multiple source image elements and multiple corresponding target correlithm objects. The processors receive an input image element comprising an n-pixel array of binary values and determine n-dimensional distances between the input image element and each of the source image elements. The processors then identify a source image element with the closest determined n-dimensional distance. The processors determine whether a deviation between the input image element and the identified source image element is within a predetermined tolerance. The processors identify a target correlithm object corresponding to the identified source image and determine a perturbation to be applied to the identified target correlithm object based on the determined deviation.

20 Claims, 16 Drawing Sheets

COMPUTER ARCHITECTURE FOR EMULATING IMAGE MAPPING IN A CORRELITHM OBJECT PROCESSING SYSTEM

TECHNICAL FIELD

The present disclosure relates generally to computer architectures for emulating image mapping, and more specifically to computer architectures for emulating image mapping in a correlithm object processing system.

BACKGROUND

Conventional computers are highly attuned to using operations that require manipulating ordinal numbers, especially ordinal binary integers. The value of an ordinal number corresponds with its position in a set of sequentially ordered number values. These computers use ordinal binary integers to represent, manipulate, and store information. These computers rely on the numerical order of ordinal binary integers representing data to perform various operations such as counting, sorting, indexing, and mathematical calculations. Even when performing operations that involve other number systems (e.g. floating point), conventional computers still resort to using ordinal binary integers to perform any operations.

Ordinal based number systems only provide information about the sequence order of the numbers themselves based on their numeric values. Ordinal numbers do not provide any information about any other types of relationships for the data being represented by the numeric values such as similarity. For example, when a conventional computer uses ordinal numbers to represent data samples (e.g. images or audio signals), different data samples are represented by different numeric values. The different numeric values do not provide any information about how similar or dissimilar one data sample is from another. Unless there is an exact match in ordinal number values, conventional systems are unable to tell if a data sample matches or is similar to any other data samples. As a result, conventional computers are unable to use ordinal numbers by themselves for comparing different data samples and instead these computers rely on complex signal processing techniques. Determining whether a data sample matches or is similar to other data samples is not a trivial task and poses several technical challenges for conventional computers. These technical challenges result in complex processes that consume processing power which reduces the speed and performance of the system. The ability to compare unknown data samples to known data samples is crucial for many security applications such as face recognition, voice recognition, and fraud detection.

Thus, it is desirable to provide a solution that allows computing systems to efficiently determine how similar different data samples are to each other and to perform operations based on their similarity.

SUMMARY

Conventional computers are highly attuned to using operations that require manipulating ordinal numbers, especially ordinal binary integers. The value of an ordinal number corresponds with its position in a set of sequentially ordered number values. These computers use ordinal binary integers to represent, manipulate, and store information. These computers rely on the numerical order of ordinal binary integers representing data to perform various operations such as counting, sorting, indexing, and mathematical calculations. Even when performing operations that involve other number systems (e.g. floating point), conventional computers still resort to using ordinal binary integers to perform any operations.

Ordinal based number systems only provide information about the sequence order of the numbers themselves based on their numeric values. Ordinal numbers do not provide any information about any other types of relationships for the data being represented by the numeric values such as similarity. For example, when a conventional computer uses ordinal numbers to represent data samples (e.g. images or audio signals), different data samples are represented by different numeric values. The different numeric values do not provide any information about how similar or dissimilar one data sample is from another. Unless there is an exact match in ordinal number values, conventional systems are unable to tell if a data sample matches or is similar to any other data samples. As a result, conventional computers are unable to use ordinal numbers by themselves for comparing different data samples and instead these computers rely on complex signal processing techniques. Determining whether a data sample matches or is similar to other data samples is not a trivial task and poses several technical challenges for conventional computers. These technical challenges result in complex processes that consume processing power which reduces the speed and performance of the system. The ability to compare unknown data samples to known data samples is crucial for many applications such as security application (e.g. face recognition, voice recognition, and fraud detection).

The system described in the present application provides a technical solution that enables the system to efficiently determine how similar different objects are to each other and to perform operations based on their similarity. In contrast to conventional systems, the system uses an unconventional configuration to perform various operations using categorical numbers and geometric objects, also referred to as correlithm objects, instead of ordinal numbers. Using categorical numbers and correlithm objects on a conventional device involves changing the traditional operation of the computer to support representing and manipulating concepts as correlithm objects. A device or system may be configured to implement or emulate a special purpose computing device capable of performing operations using correlithm objects. Implementing or emulating a correlithm object processing system improves the operation of a device by enabling the device to perform non-binary comparisons (i.e. match or no match) between different data samples. This enables the device to quantify a degree of similarity between different data samples. This increases the flexibility of the device to work with data samples having different data types and/or formats, and also increases the speed and performance of the device when performing operations using data samples. These technical advantages and other improvements to the device are described in more detail throughout the disclosure.

In one embodiment, the system is configured to use binary integers as categorical numbers rather than ordinal numbers which enables the system to determine how similar a data sample is to other data samples. Categorical numbers provide information about similar or dissimilar different data samples are from each other. For example, categorical numbers can be used in facial recognition applications to represent different images of faces and/or features of the faces. The system provides a technical advantage by allowing the system to assign correlithm objects represented by categorical numbers to different data samples based on how similar they are to other data samples. As an example, the system is able to assign correlithm objects to different images of people such that the correlithm objects can be directly used to determine how similar the people in the images are to each other. In other words, the system is able to use correlithm objects in facial recognition applications to quickly determine whether a captured image of a person matches any previously stored images without relying on conventional signal processing techniques.

Correlithm object processing systems use new types of data structures called correlithm objects that improve the way a device operates, for example, by enabling the device to perform non-binary data set comparisons and to quantify the similarity between different data samples. Correlithm objects are data structures designed to improve the way a device stores, retrieves, and compares data samples in memory. Correlithm objects also provide a data structure that is independent of the data type and format of the data samples they represent. Correlithm objects allow data samples to be directly compared regardless of their original data type and/or format.

A correlithm object processing system uses a combination of a sensor table, a node table, and/or an actor table to provide a specific set of rules that improve computer-related technologies by enabling devices to compare and to determine the degree of similarity between different data samples regardless of the data type and/or format of the data sample they represent. The ability to directly compare data samples having different data types and/or formatting is a new functionality that cannot be performed using conventional computing systems and data structures.

In addition, correlithm object processing system uses a combination of a sensor table, a node table, and/or an actor table to provide a particular manner for transforming data samples between ordinal number representations and correlithm objects in a correlithm object domain. Transforming data samples between ordinal number representations and correlithm objects involves fundamentally changing the data type of data samples between an ordinal number system and a categorical number system to achieve the previously described benefits of the correlithm object processing system.

Using correlithm objects allows the system or device to compare data samples (e.g. images) even when the input data sample does not exactly match any known or previously stored input values. For example, an input data sample that is an image may have different lighting conditions than the previously stored images. The differences in lighting conditions can make images of the same person appear different from each other. The device uses an unconventional configuration that implements a correlithm object processing system that uses the distance between the data samples which are represented as correlithm objects and other known data samples to determine whether the input data sample matches or is similar to the other known data samples. Implementing a correlithm object processing system fundamentally changes the device and the traditional data processing paradigm. Implementing the correlithm object processing system improves the operation of the device by enabling the device to perform non-binary comparisons of data samples. In other words, the device is able to determine how similar the data samples are to each other even when the data samples are not exact matches. In addition, the device is able to quantify how similar data samples are to one another. The ability to determine how similar data samples are to each other is unique and distinct from conventional computers that can only perform binary comparisons to identify exact matches.

The problems associated with comparing data sets and identifying matches based on the comparison are problems necessarily rooted in computer technologies. As described above, conventional systems are limited to a binary comparison that can only determine whether an exact match is found. Emulating a correlithm object processing system provides a technical solution that addresses problems associated with comparing data sets and identifying matches. Using correlithm objects to represent data samples fundamentally changes the operation of a device and how the device views data samples. By implementing a correlithm object processing system, the device can determine the distance between the data samples and other known data samples to determine whether the input data sample matches or is similar to the other known data samples. In addition, the device is able to determine a degree of similarity that quantifies how similar different data samples are to one another.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

FIGS. 1-5 describe various embodiments of how a correlithm object processing system may be implemented or emulated in hardware, such as a special purpose computer. FIGS. 6-10 describe various embodiments of how a correlithm object processing system may implement or emulate mapping images to correlithm objects. FIGS. 11-16 describe various embodiments of how a correlithm object processing system may implement or emulate a foveal mechanism.

Figure 1:
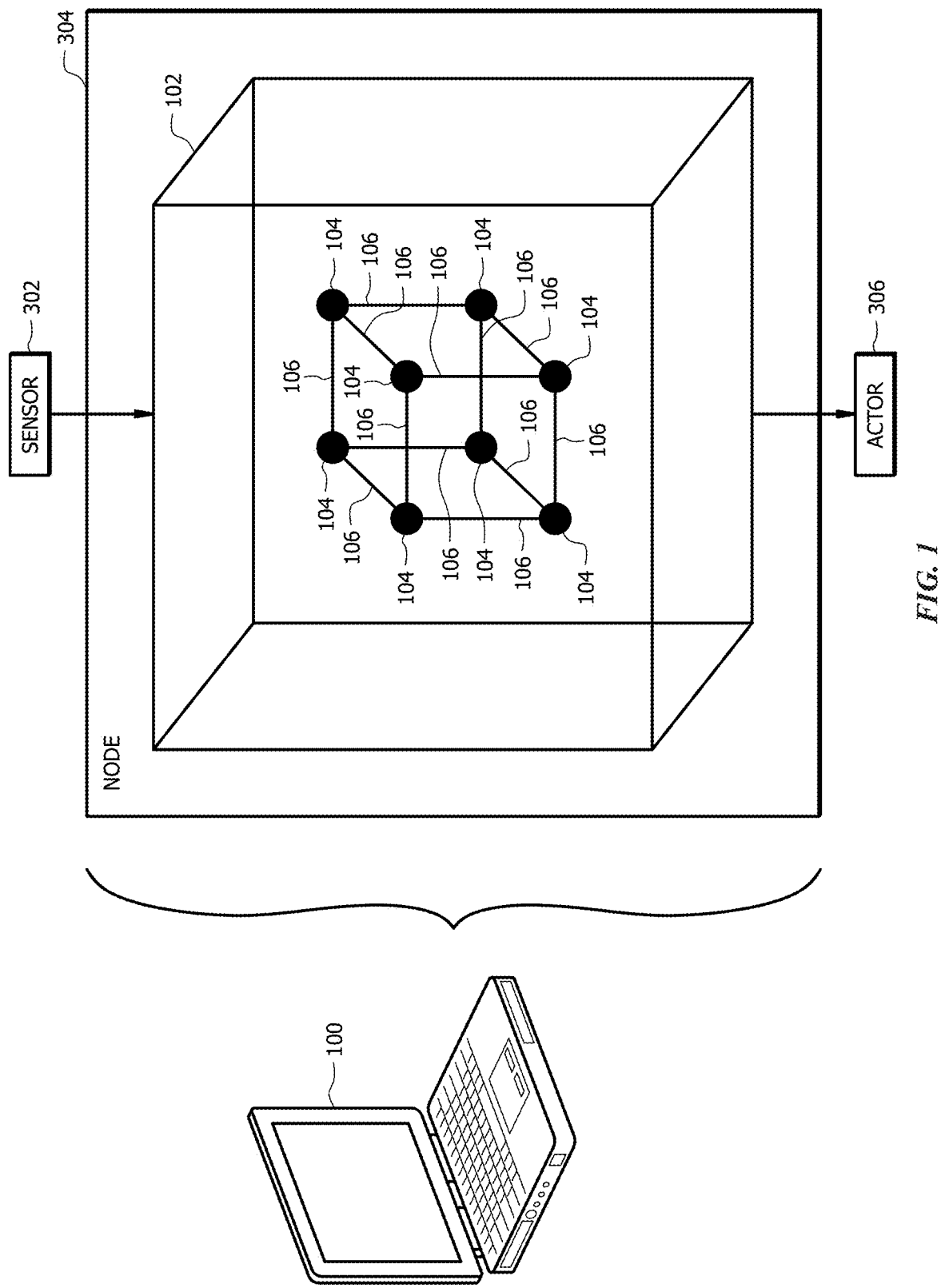
FIG. 1 is a schematic view of an embodiment of a special purpose computer implementing correlithm objects in an n-dimensional space.

FIG. 1 is a schematic view of an embodiment of a user device 100 implementing correlithm objects 104 in an n-dimensional space 102. Examples of user devices 100 include, but are not limited to, desktop computers, mobile phones, tablet computers, laptop computers, or other special purpose computer platform. The user device 100 is configured to implement or emulate a correlithm object processing system that uses categorical numbers to represent data samples as correlithm objects 104 in a high-dimensional space 102, for example a high-dimensional binary cube. Additional information about the correlithm object processing system is described in FIG. 3. Additional information about configuring the user device 100 to implement or emulate a correlithm object processing system is described in FIG. 5.

Conventional computers rely on the numerical order of ordinal binary integers representing data to perform various operations such as counting, sorting, indexing, and mathematical calculations. Even when performing operations that involve other number systems (e.g. floating point), conventional computers still resort to using ordinal binary integers to perform any operations. Ordinal based number systems only provide information about the sequence order of the numbers themselves based on their numeric values. Ordinal numbers do not provide any information about any other types of relationships for the data being represented by the numeric values, such as similarity. For example, when a conventional computer uses ordinal numbers to represent data samples (e.g. images or audio signals), different data samples are represented by different numeric values. The different numeric values do not provide any information about how similar or dissimilar one data sample is from another. In other words, conventional computers are only able to make binary comparisons of data samples which only results in determining whether the data samples match or do not match. Unless there is an exact match in ordinal number values, conventional systems are unable to tell if a data sample matches or is similar to any other data samples. As a result, conventional computers are unable to use ordinal numbers by themselves for determining similarity between different data samples, and instead these computers rely on complex signal processing techniques. Determining whether a data sample matches or is similar to other data samples is not a trivial task and poses several technical challenges for conventional computers. These technical challenges result in complex processes that consume processing power which reduces the speed and performance of the system.

In contrast to conventional systems, the user device 100 operates as a special purpose machine for implementing or emulating a correlithm object processing system. Implementing or emulating a correlithm object processing system improves the operation of the user device 100 by enabling the user device 100 to perform non-binary comparisons (i.e. match or no match) between different data samples. This enables the user device 100 to quantify a degree of similarity between different data samples. This increases the flexibility of the user device 100 to work with data samples having different data types and/or formats, and also increases the speed and performance of the user device 100 when performing operations using data samples. These improvements and other benefits to the user device 100 are described in more detail below and throughout the disclosure.

For example, the user device 100 employs the correlithm object processing system to allow the user device 100 to compare data samples even when the input data sample does not exactly match any known or previously stored input values. Implementing a correlithm object processing system fundamentally changes the user device 100 and the traditional data processing paradigm. Implementing the correlithm object processing system improves the operation of the user device 100 by enabling the user device 100 to perform non-binary comparisons of data samples. In other words, the user device 100 is able to determine how similar the data samples are to each other even when the data samples are not exact matches. In addition, the user device 100 is able to quantify how similar data samples are to one another. The ability to determine how similar data samples are to each others is unique and distinct from conventional computers that can only perform binary comparisons to identify exact matches.

The user device's 100 ability to perform non-binary comparisons of data samples also fundamentally changes traditional data searching paradigms. For example, conventional search engines rely on finding exact matches or exact partial matches of search tokens to identify related data samples. For instance, conventional text-based search engine are limited to finding related data samples that have text that exactly matches other data samples. These search engines only provide a binary result that identifies whether or not an exact match was found based on the search token. Implementing the correlithm object processing system improves the operation of the user device 100 by enabling the user device 100 to identify related data samples based on how similar the search token is to other data sample. These improvements result in increased flexibility and faster search time when using a correlithm object processing system. The ability to identify similarities between data samples expands the capabilities of a search engine to include data samples that may not have an exact match with a search token but are still related and similar in some aspects. The user device 100 is also able to quantify how similar data samples are to each other based on characteristics besides exact matches to the search token. Implementing the correlithm object processing system involves operating the user device 100 in an unconventional manner to achieve these technological improvements as well as other benefits described below for the user device 100.

Computing devices typically rely on the ability to compare data sets (e.g. data samples) to one another for processing. For example, in security or authentication applications a computing device is configured to compare an input of an unknown person to a data set of known people (or biometric information associated with these people). The problems associated with comparing data sets and identifying matches based on the comparison are problems necessarily rooted in computer technologies. As described above, conventional systems are limited to a binary comparison that can only determine whether an exact match is found. As an example, an input data sample that is an image of a person may have different lighting conditions than previously stored images. In this example, different lighting conditions can make images of the same person appear different from each other. Conventional computers are unable to distinguish between two images of the same person with different lighting conditions and two images of two different people without complicated signal processing. In both of these cases, conventional computers can only determine that the images are different. This is because conventional computers rely on manipulating ordinal numbers for processing.

In contrast, the user device 100 uses an unconventional configuration that uses correlithm objects to represent data samples. Using correlithm objects to represent data samples fundamentally changes the operation of the user device 100 and how the device views data samples. By implementing a correlithm object processing system, the user device 100 can determine the distance between the data samples and other known data samples to determine whether the input data sample matches or is similar to the other known data samples, as explained in detail below. Unlike the conventional computers described in the previous example, the user device 100 is able to distinguish between two images of the same person with different lighting conditions and two images of two different people by using correlithm objects 104. Correlithm objects allow the user device 100 to determine whether there are any similarities between data samples, such as between two images that are different from each other in some respects but similar in other respects. For example, the user device 100 is able to determine that despite different lighting conditions, the same person is present in both images.

In addition, the user device 100 is able to determine a degree of similarity that quantifies how similar different data samples are to one another. Implementing a correlithm object processing system in the user device 100 improves the operation of the user device 100 when comparing data sets and identifying matches by allowing the user device 100 to perform non-binary comparisons between data sets and to quantify the similarity between different data samples. In addition, using a correlithm object processing system results in increased flexibility and faster search times when comparing data samples or data sets. Thus, implementing a correlithm object processing system in the user device 100 provides a technical solution to a problem necessarily rooted in computer technologies.

The ability to implement a correlithm object processing system provides a technical advantage by allowing the system to identify and compare data samples regardless of whether an exact match has been previous observed or stored. In other words, using the correlithm object processing system the user device 100 is able to identify similar data samples to an input data sample in the absence of an exact match. This functionality is unique and distinct from conventional computers that can only identify data samples with exact matches.

Examples of data samples include, but are not limited to, images, files, text, audio signals, biometric signals, electric signals, or any other suitable type of data. A correlithm object 104 is a point in the n-dimensional space 102, sometimes called an "n-space." The value of represents the number of dimensions of the space. For example, an n-dimensional space 102 may be a 3-dimensional space, a 50-dimensional space, a 100-dimensional space, or any other suitable dimension space. The number of dimensions depends on its ability to support certain statistical tests, such as the distances between pairs of randomly chosen points in the space approximating a normal distribution. In some embodiments, increasing the number of dimensions in the n-dimensional space 102 modifies the statistical properties of the system to provide improved results. Increasing the number of dimensions increases the probability that a correlithm object 104 is similar to other adjacent correlithm objects 104. In other words, increasing the number of dimensions increases the correlation between how close a pair of correlithm objects 104 are to each other and how similar the correlithm objects 104 are to each other.

Correlithm object processing systems use new types of data structures called correlithm objects 104 that improve the way a device operates, for example, by enabling the device to perform non-binary data set comparisons and to quantify the similarity between different data samples. Correlithm objects 104 are data structures designed to improve the way a device stores, retrieves, and compares data samples in memory. Unlike conventional data structures, correlithm objects 104 are data structures where objects can be expressed in a high-dimensional space such that distance 106 between points in the space represent the similarity between different objects or data samples. In other words, the distance 106 between a pair of correlithm objects 104 in the n-dimensional space 102 indicates how similar the correlithm objects 104 are from each other and the data samples they represent. Correlithm objects 104 that are close to each other are more similar to each other than correlithm objects 104 that are further apart from each other. For example, in a facial recognition application, correlithm objects 104 used to represent images of different types of glasses may be relatively close to each other compared to correlithm objects 104 used to represent images of other features such as facial hair. An exact match between two data samples occurs when their corresponding correlithm objects 104 are the same or have no distance between them. When two data samples are not exact matches but are similar, the distance between their correlithm objects 104 can be used to indicate their similarities. In other words, the distance 106 between correlithm objects 104 can be used to identify both data samples that exactly match each other as well as data samples that do not match but are similar. This feature is unique to a correlithm processing system and is unlike conventional computers that are unable to detect when data samples are different but similar in some aspects.

Correlithm objects 104 also provide a data structure that is independent of the data type and format of the data samples they represent. Correlithm objects 104 allow data samples to be directly compared regardless of their original data type and/or format. In some instances, comparing data samples as correlithm objects 104 is computationally more efficient and faster than comparing data samples in their original format. For example, comparing images using conventional data structures involves significant amounts of image processing which is time consuming and consumes processing resources. Thus, using correlithm objects 104 to represent data samples provides increased flexibility and improved performance compared to using other conventional data structures.

In one embodiment, correlithm objects 104 may be represented using categorical binary strings. The number of bits used to represent the correlithm object 104 corresponds with the number of dimensions of the n-dimensional space 102 where the correlithm object 102 is located. For example, each correlithm object 104 may be uniquely identified using a 64-bit string in a 64-dimensional space 102. As another example, each correlithm object 104 may be uniquely identified using a 10-bit string in a 10-dimensional space 102. In other examples, correlithm objects 104 can be identified using any other suitable number of bits in a string that corresponds with the number of dimensions in the n-dimensional space 102.

In this configuration, the distance 106 between two correlithm objects 104 can be determined based on the differences between the bits of the two correlithm objects 104. In other words, the distance 106 between two correlithm objects can be determined based on how many individual bits differ between the correlithm objects 104. The distance 106 between two correlithm objects 104 can be computed using Hamming distance or any other suitable technique.

As an example using a 10-dimensional space 102, a first correlithm object 104 is represented by a first 10-bit string (1001011011) and a second correlithm object 104 is represented by a second 10-bit string (1000011011). The Hamming distance corresponds with the number of bits that differ between the first correlithm object 104 and the second correlithm object 104. In other words, the Hamming distance between the first correlithm object 104 and the second correlithm object 104 can be computed as follows:

1001011011
   1000011011
   - - -
   0001000000

In this example, the Hamming distance is equal to one because only one bit differs between the first correlithm object 104 and the second correlithm object. As another example, a third correlithm object 104 is represented by a third 10-bit string (0110100100). In this example, the Hamming distance between the first correlithm object 104 and the third correlithm object 104 can be computed as follows:

1001011011
   0110100100
   - - -
   1111111111

The Hamming distance is equal to ten because all of the bits are different between the first correlithm object 104 and the third correlithm object 104. In the previous example, a Hamming distance equal to one indicates that the first correlithm object 104 and the second correlithm object 104 are close to each other in the n-dimensional space 102, which means they are similar to each other. In the second example, a Hamming distance equal to ten indicates that the first correlithm object 104 and the third correlithm object 104 are further from each other in the n-dimensional space 102 and are less similar to each other than the first correlithm object 104 and the second correlithm object 104. In other words, the similarity between a pair of correlithm objects can be readily determined based on the distance between the pair correlithm objects.

As another example, the distance between a pair of correlithm objects 104 can be determined by performing an XOR operation between the pair of correlithm objects 104 and counting the number of logical high values in the binary string. The number of logical high values indicates the number of bits that are different between the pair of correlithm objects 104 which also corresponds with the Hamming distance between the pair of correlithm objects 104.

In another embodiment, the distance 106 between two correlithm objects 104 can be determined using a Minkowski distance such as the Euclidean or "straight-line" distance between the correlithm objects 104. For example, the distance 106 between a pair of correlithm objects 104 may be determined by calculating the square root of the sum of squares of the coordinate difference in each dimension.

The user device 100 is configured to implement or emulate a correlithm object processing system that comprises one or more sensors 302, nodes 304, and/or actors 306 in order to convert data samples between real world values or representations and to correlithm objects 104 in a correlithm object domain. Sensors 302 are generally configured to convert real world data samples to the correlithm object domain. Nodes 304 are generally configured to process or perform various operations on correlithm objects in the correlithm object domain. Actors 306 are generally configured to convert correlithm objects 104 into real world values or representations. Additional information about sensors 302, nodes 304, and actors 306 is described in FIG. 3.

Performing operations using correlithm objects 104 in a correlithm object domain allows the user device 100 to identify relationships between data samples that cannot be identified using conventional data processing systems. For example, in the correlithm object domain, the user device 100 is able to identify not only data samples that exactly match an input data sample, but also other data samples that have similar characteristics or features as the input data samples. Conventional computers are unable to identify these types of relationships readily. Using correlithm objects 104 improves the operation of the user device 100 by enabling the user device 100 to efficiently process data samples and identify relationships between data samples without relying on signal processing techniques that require a significant amount of processing resources. These benefits allow the user device 100 to operate more efficiently than conventional computers by reducing the amount of processing power and resources that are needed to perform various operations.

Figure 2:
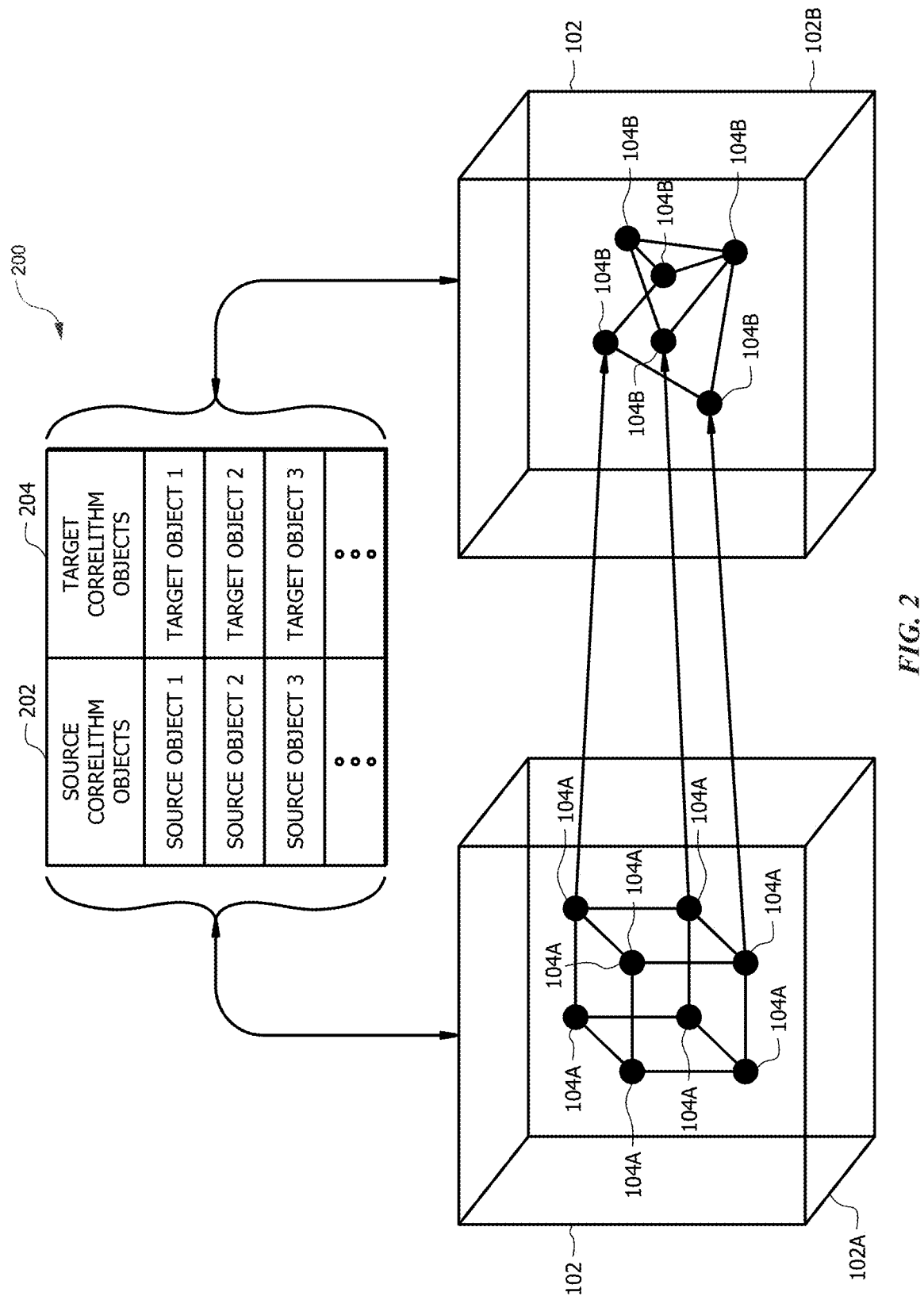
FIG. 2 is a perspective view of an embodiment of a mapping between correlithm objects in different n-dimensional spaces.

FIG. 2 is a schematic view of an embodiment of a mapping between correlithm objects 104 in different n-dimensional spaces 102. When implementing a correlithm object processing system, the user device 100 performs operations within the correlithm object domain using correlithm objects 104 in different n-dimensional spaces 102. As an example, the user device 100 may convert different types of data samples having real world values into correlithm objects 104 in different n-dimensional spaces 102. For instance, the user device 100 may convert data samples of text into a first set of correlithm objects 104 in a first n-dimensional space 102 and data samples of audio samples as a second set of correlithm objects 104 in a second n-dimensional space 102. Conventional systems require data samples to be of the same type and/or format in order to perform any kind of operation on the data samples. In some instances, some types of data samples cannot be compared because there is no common format available. For example, conventional computers are unable to compare data samples of images and data samples of audio samples because there is no common format. In contrast, the user device 100 implementing a correlithm object processing system is able to compare and perform operations using correlithm objects 104 in the correlithm object domain regardless of the type or format of the original data samples.

In FIG. 2, a first set of correlithm objects 104A are defined within a first n-dimensional space 102A and a second set of correlithm objects 104B are defined within a second n-dimensional space 102B. The n-dimensional spaces may have the same number of dimensions or a different number of dimensions. For example, the first n-dimensional space 102A and the second n-dimensional space 102B may both be three dimensional spaces. As another example, the first n-dimensional space 102A may be a three dimensional space and the second n-dimensional space 102B may be a nine dimensional space. Correlithm objects 104 in the first n-dimensional space 102A and second n-dimensional space 102B are mapped to each other. In other words, a correlithm object 104A in the first n-dimensional space 102A may reference or be linked with a particular correlithm object 104B in the second n-dimensional space 102B. The correlithm objects 104 may also be linked with and referenced with other correlithm objects 104 in other n-dimensional spaces 102.

In one embodiment, a data structure such as table 200 may be used to map or link correlithm objects 104 in different n-dimensional spaces 102. In some instances, table 200 is referred to as a node table. Table 200 is generally configured to identify a first plurality of correlithm objects 104 in a first n-dimensional space 102 and a second plurality of correlithm objects 104 in a second n-dimensional space 102. Each correlithm object 104 in the first n-dimensional space 102 is linked with a correlithm object 104 is the second n-dimensional space 102. For example, table 200 may be configured with a first column 202 that lists correlithm objects 104A as source correlithm objects and a second column 204 that lists corresponding correlithm objects 104B as target correlithm objects. In other examples, table 200 may be configured in any other suitable manner or may be implemented using any other suitable data structure. In some embodiments, one or more mapping functions may be used to convert between a correlithm object 104 in a first n-dimensional space and a correlithm object 104 is a second n-dimensional space.

Figure 3:
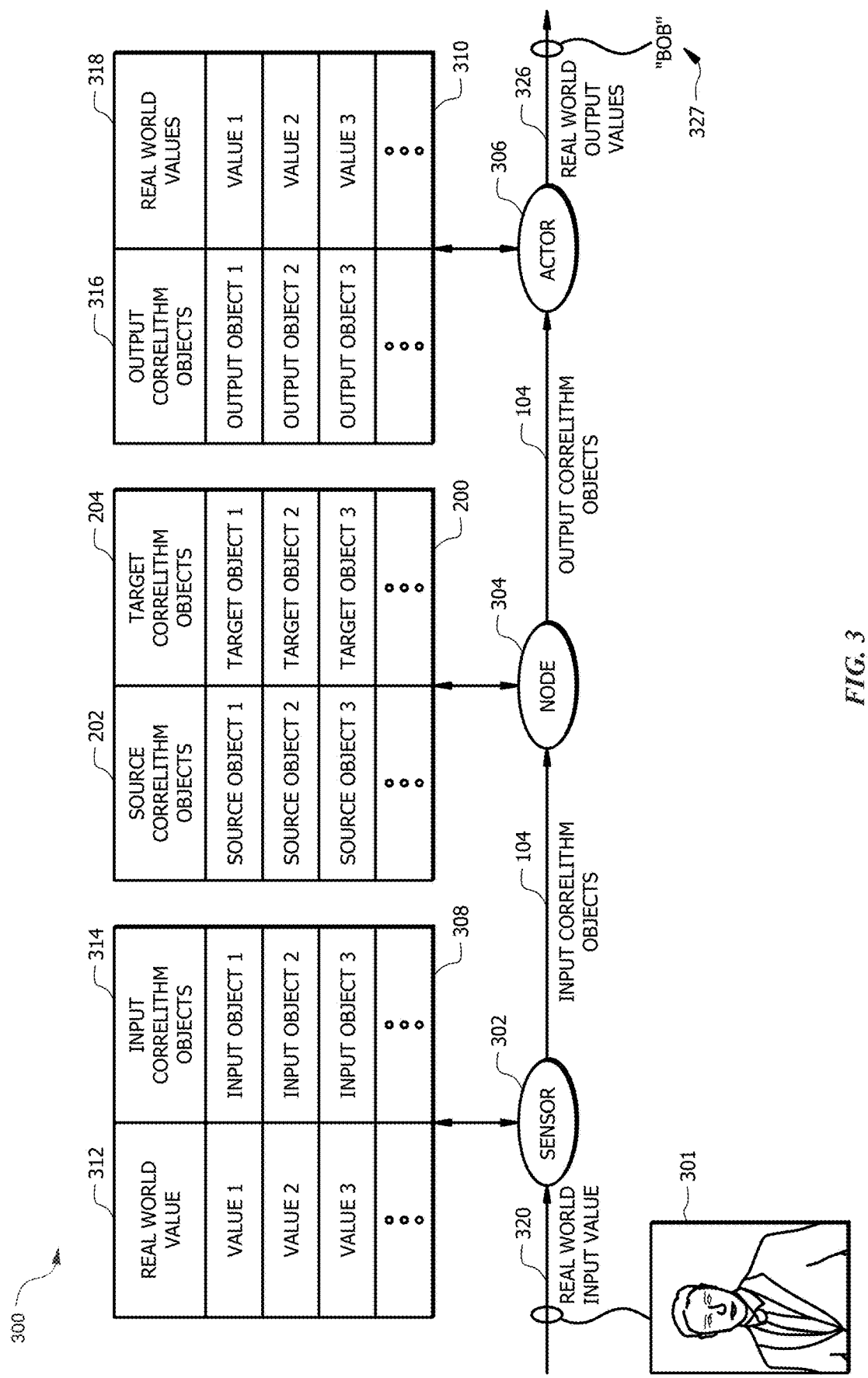
FIG. 3 is a schematic view of an embodiment of a correlithm object processing system.

FIG. 3 is a schematic view of an embodiment of a correlithm object processing system 300 that is implemented by a user device 100 to perform operations using correlithm objects 104. The system 300 generally comprises a sensor 302, a node 304, and an actor 306. The system 300 may be configured with any suitable number and/or configuration of sensors 302, nodes 304, and actors 306. An example of the system 300 in operation is described in FIG. 4. In one embodiment, a sensor 302, a node 304, and an actor 306 may all be implemented on the same device (e.g. user device 100). In other embodiments, a sensor 302, a node 304, and an actor 306 may each be implemented on different devices in signal communication with each other for example over a network. In other embodiments, different devices may be configured to implement any combination of sensors 302, nodes 304, and actors 306.

Sensors 302 serve as interfaces that allow a user device 100 to convert real world data samples into correlithm objects 104 that can be used in the correlithm object domain. Sensors 302 enable the user device 100 to compare and perform operations using correlithm objects 104 regardless of the data type or format of the original data sample. Sensors 302 are configured to receive a real world value 320 representing a data sample as an input, to determine a correlithm object 104 based on the real world value 320, and to output the correlithm object 104. For example, the sensor 302 may receive an image 301 of a person and output a correlithm object 322 to the node 304 or actor 306. In one embodiment, sensors 302 are configured to use sensor tables 308 that link a plurality of real world values with a plurality of correlithm objects 104 in an n-dimensional space 102. Real world values are any type of signal, value, or representation of data samples. Examples of real world values include, but are not limited to, images, pixel values, text, audio signals, electrical signals, and biometric signals. As an example, a sensor table 308 may be configured with a first column 312 that lists real world value entries corresponding with different images and a second column 314 that lists corresponding correlithm objects 104 as input correlithm objects. In other examples, sensor tables 308 may be configured in any other suitable manner or may be implemented using any other suitable data structure. In some embodiments, one or more mapping functions may be used to translate between a real world value 320 and a correlithm object 104 in an n-dimensional space. Additional information for implementing or emulating a sensor 302 in hardware is described in FIG. 5.

Nodes 304 are configured to receive a correlithm object 104 (e.g. an input correlithm object 104), to determine another correlithm object 104 based on the received correlithm object 104, and to output the identified correlithm object 104 (e.g. an output correlithm object 104). In one embodiment, nodes 304 are configured to use node tables 200 that link a plurality of correlithm objects 104 from a first n-dimensional space 102 with a plurality of correlithm objects 104 in a second n-dimensional space 102. A node table 200 may be configured similar to the table 200 described in FIG. 2. Additional information for implementing or emulating a node 304 in hardware is described in FIG. 5.

Actors 306 serve as interfaces that allow a user device 100 to convert correlithm objects 104 in the correlithm object domain back to real world values or data samples. Actors 306 enable the user device 100 to convert from correlithm objects 104 into any suitable type of real world value. Actors 306 are configured to receive a correlithm object 104 (e.g. an output correlithm object 104), to determine a real world output value 326 based on the received correlithm object 104, and to output the real world output value 326. The real world output value 326 may be a different data type or representation of the original data sample. As an example, the real world input value 320 may be an image 301 of a person and the resulting real world output value 326 may be text 327 and/or an audio signal identifying the person. In one embodiment, actors 306 are configured to use actor tables 310 that link a plurality of correlithm objects 104 in an n-dimensional space 102 with a plurality of real world values. As an example, an actor table 310 may be configured with a first column 316 that lists correlithm objects 104 as output correlithm objects and a second column 318 that lists real world values. In other examples, actor tables 310 may be configured in any other suitable manner or may be implemented using any other suitable data structure. In some embodiments, one or more mapping functions may be employed to translate between a correlithm object 104 in an n-dimensional space and a real world output value 326. Additional information for implementing or emulating an actor 306 in hardware is described in FIG. 5.

A correlithm object processing system 300 uses a combination of a sensor table 308, a node table 200, and/or an actor table 310 to provide a specific set of rules that improve computer-related technologies by enabling devices to compare and to determine the degree of similarity between different data samples regardless of the data type and/or format of the data sample they represent. The ability to directly compare data samples having different data types and/or formatting is a new functionality that cannot be performed using conventional computing systems and data structures. Conventional systems require data samples to be of the same type and/or format in order to perform any kind of operation on the data samples. In some instances, some types of data samples are incompatible with each other and cannot be compared because there is no common format available. For example, conventional computers are unable to compare data samples of images with data samples of audio samples because there is no common format available. In contrast, a device implementing a correlithm object processing system uses a combination of a sensor table 308, a node table 200, and/or an actor table 310 to compare and perform operations using correlithm objects 104 in the correlithm object domain regardless of the type or format of the original data samples. The correlithm object processing system 300 uses a combination of a sensor table 308, a node table 200, and/or an actor table 310 as a specific set of rules that provides a particular solution to dealing with different types of data samples and allows devices to perform operations on different types of data samples using correlithm objects 104 in the correlithm object domain. In some instances, comparing data samples as correlithm objects 104 is computationally more efficient and faster than comparing data samples in their original format. Thus, using correlithm objects 104 to represent data samples provides increased flexibility and improved performance compared to using other conventional data structures. The specific set of rules used by the correlithm object processing system 300 go beyond simply using routine and conventional activities in order to achieve this new functionality and performance improvements.

In addition, correlithm object processing system 300 uses a combination of a sensor table 308, a node table 200, and/or an actor table 310 to provide a particular manner for transforming data samples between ordinal number representations and correlithm objects 104 in a correlithm object domain. For example, the correlithm object processing system 300 may be configured to transform a representation of a data sample into a correlithm object 104, to perform various operations using the correlithm object 104 in the correlithm object domain, and to transform a resulting correlithm object 104 into another representation of a data sample. Transforming data samples between ordinal number representations and correlithm objects 104 involves fundamentally changing the data type of data samples between an ordinal number system and a categorical number system to achieve the previously described benefits of the correlithm object processing system 300.

Figure 4:
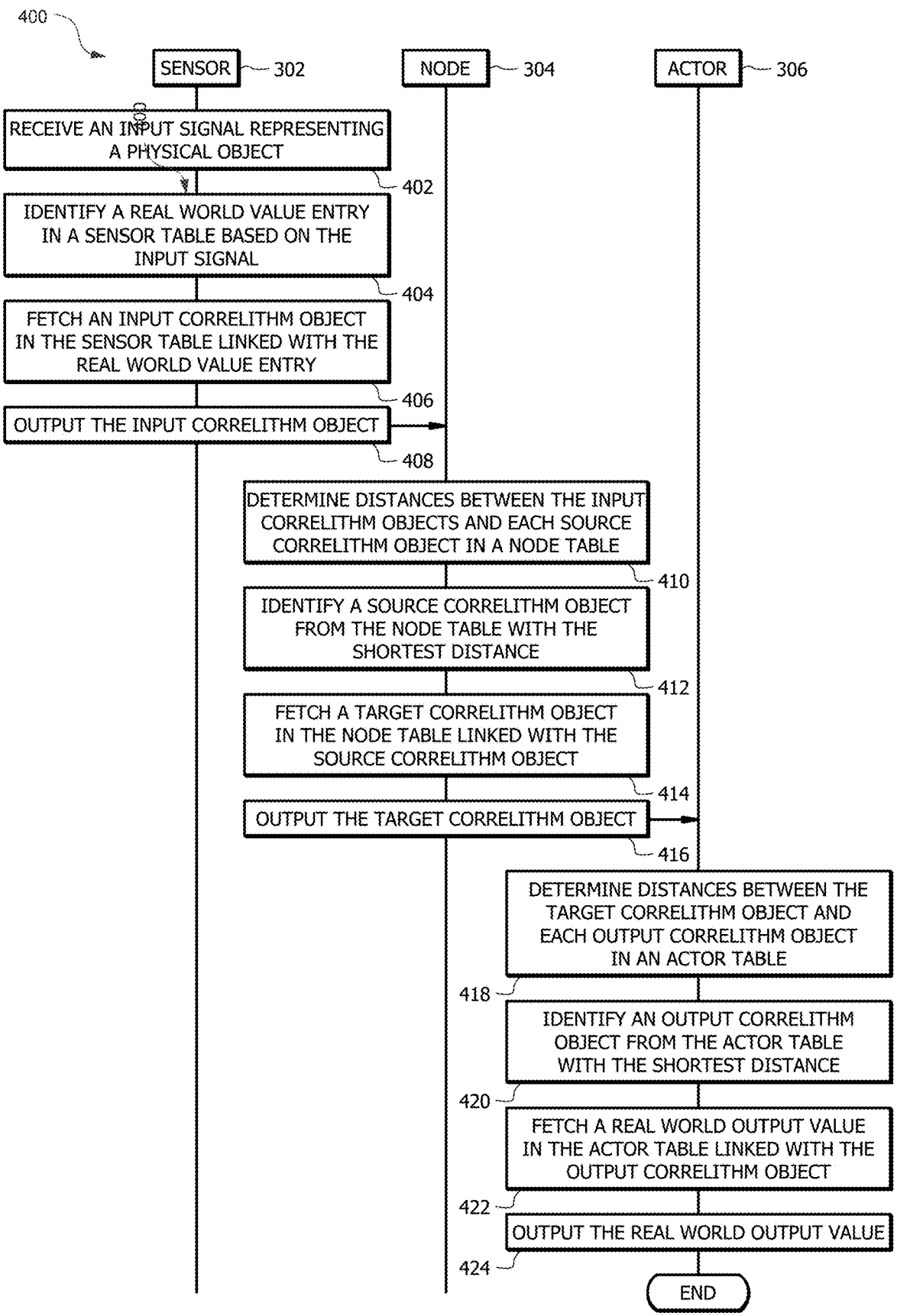
FIG. 4 is a protocol diagram of an embodiment of a correlithm object process flow.

FIG. 4 is a protocol diagram of an embodiment of a correlithm object process flow 400. A user device 100 implements process flow 400 to emulate a correlithm object processing system 300 to perform operations using correlithm object 104 such as facial recognition. The user device 100 implements process flow 400 to compare different data samples (e.g. images, voice signals, or text) to each other and to identify other objects based on the comparison. Process flow 400 provides instructions that allows user devices 100 to achieve the improved technical benefits of a correlithm object processing system 300.

Conventional systems are configured to use ordinal numbers for identifying different data samples. Ordinal based number systems only provide information about the sequence order of numbers based on their numeric values, and do not provide any information about any other types of relationships for the data samples being represented by the numeric values such as similarity. In contrast, a user device 100 can implement or emulate the correlithm object processing system 300 which provides an unconventional solution that uses categorical numbers and correlithm objects 104 to represent data samples. For example, the system 300 may be configured to use binary integers as categorical numbers to generate correlithm objects 104 which enables the user device 100 to perform operations directly based on similarities between different data samples. Categorical numbers provide information about how similar different data sample are from each other. Correlithm objects 104 generated using categorical numbers can be used directly by the system 300 for determining how similar different data samples are from each other without relying on exact matches, having a common data type or format, or conventional signal processing techniques.

A non-limiting example is provided to illustrate how the user device 100 implements process flow 400 to emulate a correlithm object processing system 300 to perform facial recognition on an image to determine the identity of the person in the image. In other examples, the user device 100 may implement process flow 400 to emulate a correlithm object processing system 300 to perform voice recognition, text recognition, or any other operation that compares different objects.

At step 402, a sensor 302 receives an input signal representing a data sample. For example, the sensor 302 receives an image of person's face as a real world input value 320. The input signal may be in any suitable data type or format. In one embodiment, the sensor 302 may obtain the input signal in real-time from a peripheral device (e.g. a camera). In another embodiment, the sensor 302 may obtain the input signal from a memory or database.

At step 404, the sensor 302 identifies a real world value entry in a sensor table 308 based on the input signal. In one embodiment, the system 300 identifies a real world value entry in the sensor table 308 that matches the input signal. For example, the real world value entries may comprise previously stored images. The sensor 302 may compare the received image to the previously stored images to identify a real world value entry that matches the received image. In one embodiment, when the sensor 302 does not find an exact match, the sensor 302 finds a real world value entry that closest matches the received image.

At step 406, the sensor 302 identifies and fetches an input correlithm object 104 in the sensor table 308 linked with the real world value entry. At step 408, the sensor 302 sends the identified input correlithm object 104 to the node 304. In one embodiment, the identified input correlithm object 104 is represented in the sensor table 308 using a categorical binary integer string. The sensor 302 sends the binary string representing to the identified input correlithm object 104 to the node 304.

At step 410, the node 304 receives the input correlithm object 104 and determines distances 106 between the input correlithm object 104 and each source correlithm object 104 in a node table 200. In one embodiment, the distance 106 between two correlithm objects 104 can be determined based on the differences between the bits of the two correlithm objects 104. In other words, the distance 106 between two correlithm objects can be determined based on how many individual bits differ between a pair of correlithm objects 104. The distance 106 between two correlithm objects 104 can be computed using Hamming distance or any other suitable technique. In another embodiment, the distance 106 between two correlithm objects 104 can be determined using a Minkowski distance such as the Euclidean or "straight-line" distance between the correlithm objects 104. For example, the distance 106 between a pair of correlithm objects 104 may be determined by calculating the square root of the sum of squares of the coordinate difference in each dimension.

At step 412, the node 304 identifies a source correlithm object 104 from the node table 200 with the shortest distance 106. A source correlithm object 104 with the shortest distance from the input correlithm object 104 is a correlithm object 104 either matches or most closely matches the received input correlithm object 104.

At step 414, the node 304 identifies and fetches a target correlithm object 104 in the node table 200 linked with the source correlithm object 104. At step 416, the node 304 outputs the identified target correlithm object 104 to the actor 306. In this example, the identified target correlithm object 104 is represented in the node table 200 using a categorical binary integer string. The node 304 sends the binary string representing to the identified target correlithm object 104 to the actor 306.

At step 418, the actor 306 receives the target correlithm object 104 and determines distances between the target correlithm object 104 and each output correlithm object 104 in an actor table 310. The actor 306 may compute the distances between the target correlithm object 104 and each output correlithm object 104 in an actor table 310 using a process similar to the process described in step 410.

At step 420, the actor 306 identifies an output correlithm object 104 from the actor table 310 with the shortest distance 106. An output correlithm object 104 with the shortest distance from the target correlithm object 104 is a correlithm object 104 either matches or most closely matches the received target correlithm object 104.

At step 422, the actor 306 identifies and fetches a real world output value in the actor table 310 linked with the output correlithm object 104. The real world output value may be any suitable type of data sample that corresponds with the original input signal. For example, the real world output value may be text that indicates the name of the person in the image or some other identifier associated with the person in the image. As another example, the real world output value may be an audio signal or sample of the name of the person in the image. In other examples, the real world output value may be any other suitable real world signal or value that corresponds with the original input signal. The real world output value may be in any suitable data type or format.

At step 424, the actor 306 outputs the identified real world output value. In one embodiment, the actor 306 may output the real world output value in real-time to a peripheral device (e.g. a display or a speaker). In one embodiment, the actor 306 may output the real world output value to a memory or database. In one embodiment, the real world output value is sent to another sensor 302. For example, the real world output value may be sent to another sensor 302 as an input for another process.

Figure 5:
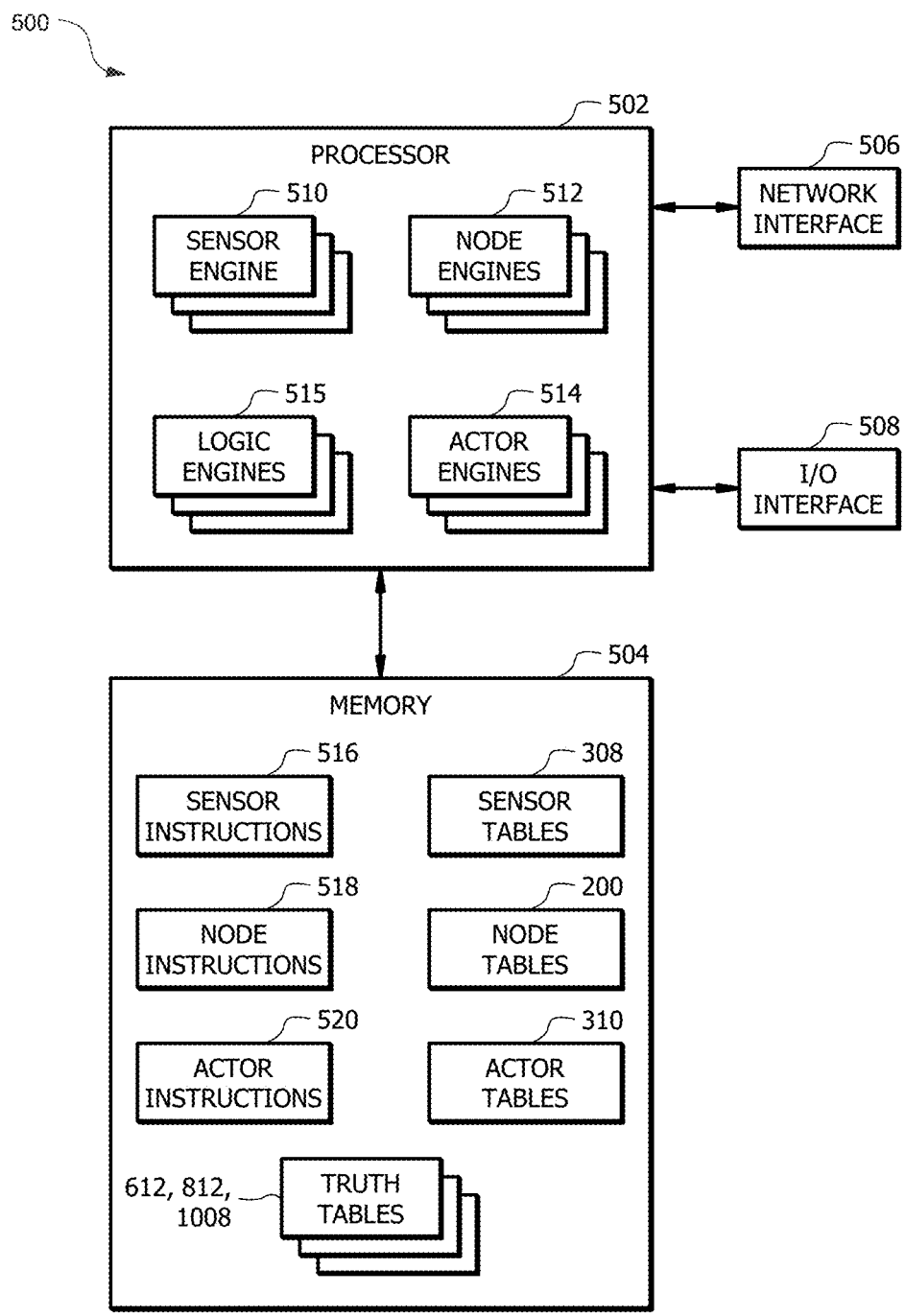
FIG. 5 is a schematic diagram of an embodiment a computer architecture for emulating a correlithm object processing system.

FIG. 5 is a schematic diagram of an embodiment of a computer architecture 500 for emulating a correlithm object processing system 300 in a user device 100. The computer architecture 500 comprises a processor 502, a memory 504, a network interface 506, and an input-output (I/O) interface 508. The computer architecture 500 may be configured as shown or in any other suitable configuration.

The processor 502 comprises one or more processors operably coupled to the memory 504. The processor 502 is any electronic circuitry including, but not limited to, state machines, one or more central processing unit (CPU) chips, logic units, cores (e.g. a multi-core processor), field-programmable gate array (FPGAs), application specific integrated circuits (ASICs), graphics processing units (GPUs), or digital signal processors (DSPs). The processor 502 may be a programmable logic device, a microcontroller, a microprocessor, or any suitable combination of the preceding. The processor 502 is communicatively coupled to and in signal communication with the memory 204. The one or more processors are configured to process data and may be implemented in hardware or software. For example, the processor 502 may be 8-bit, 16-bit, 32-bit, 64-bit or of any other suitable architecture. The processor 502 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement sensor engines 510, node engines 512, and actor engines 514. In an embodiment, the sensor engines 510, the node engines 512, and the actor engines 514 are implemented using logic units, FPGAs, ASICs, DSPs, or any other suitable hardware. The sensor engines 510, the node engines 512, and the actor engines 514 are each configured to implement a specific set of rules or process that provides an improved technological result.

In one embodiment, the sensor engine 510 is configured to receive a real world value 320 as an input, to determine a correlithm object 104 based on the real world value 320, and to output the correlithm object 104. Examples of the sensor engine 510 in operation are described in FIG. 4.

In one embodiment, the node engine 512 is configured to receive a correlithm object 104 (e.g. an input correlithm object 104), to determine another correlithm object 104 based on the received correlithm object 104, and to output the identified correlithm object 104 (e.g. an output correlithm object 104). The node engine 512 is also configured to compute distances between pairs of correlithm objects 104. Examples of the node engine 512 in operation are described in FIG. 4.

In one embodiment, the actor engine 514 is configured to receive a correlithm object 104 (e.g. an output correlithm object 104), to determine a real world output value 326 based on the received correlithm object 104, and to output the real world output value 326. Examples of the actor engine 514 in operation are described in FIG. 4.

The memory 504 comprises one or more non-transitory disks, tape drives, or solid-state drives, and may be used as an over-flow data storage device, to store programs when such programs are selected for execution, and to store instructions and data that are read during program execution. The memory 504 may be volatile or non-volatile and may comprise read-only memory (ROM), random-access memory (RAM), ternary content-addressable memory (TCAM), dynamic random-access memory (DRAM), and static random-access memory (SRAM). The memory 504 is operable to store sensor instructions 516, node instructions 518, actor instructions 520, sensor tables 308, node tables 200, actor tables 310, and/or any other data or instructions. The sensor instructions 516, the node instructions 518, and the actor instructions 520 comprise any suitable set of instructions, logic, rules, or code operable to execute the sensor engine 510, node engine 512, and the actor engine 514, respectively.

The sensor tables 308, the node tables 200, and the actor tables 310 may be configured similar to the sensor tables 308, the node tables 200, and the actor tables 310 described in FIG. 3, respectively.

The network interface 506 is configured to enable wired and/or wireless communications. The network interface 506 is configured to communicate data with any other device or system. For example, the network interface 506 may be configured for communication with a modem, a switch, a router, a bridge, a server, or a client. The processor 502 is configured to send and receive data using the network interface 506.

The I/O interface 508 may comprise ports, transmitters, receivers, transceivers, or any other devices for transmitting and/or receiving data with peripheral devices as would be appreciated by one of ordinary skill in the art upon viewing this disclosure. For example, the I/O interface 508 may be configured to communicate data between the processor 502 and peripheral hardware such as a graphical user interface, a display, a mouse, a keyboard, a key pad, and a touch sensor (e.g. a touch screen).

As noted before, sensors 302 serve as interfaces that allow a user device 100 to convert real world data samples into correlithm objects 104 that can be used in the correlithm object domain. Sensors 302 are configured to receive a real world value representing a data sample as an input, to determine a correlithm object 104 based on the real world value, and to output the correlithm object 104. For example, the sensor 302 may receive an image of a person and output a correlithm object 104. In one embodiment, sensors 302 are configured to use sensor tables 308 that link a plurality of real world values with a plurality of correlithm objects 104 in an n-dimensional space. Real world values are any type of signal, value, or representation of data samples. Examples of real world values include, but are not limited to, images, pixel values, text, audio signals, electrical signals, and biometric signals. As an example, a sensor table 308 may be configured with a first column that lists real world value entries corresponding with different images and a second column that lists corresponding correlithm objects 104.

Figure 6:
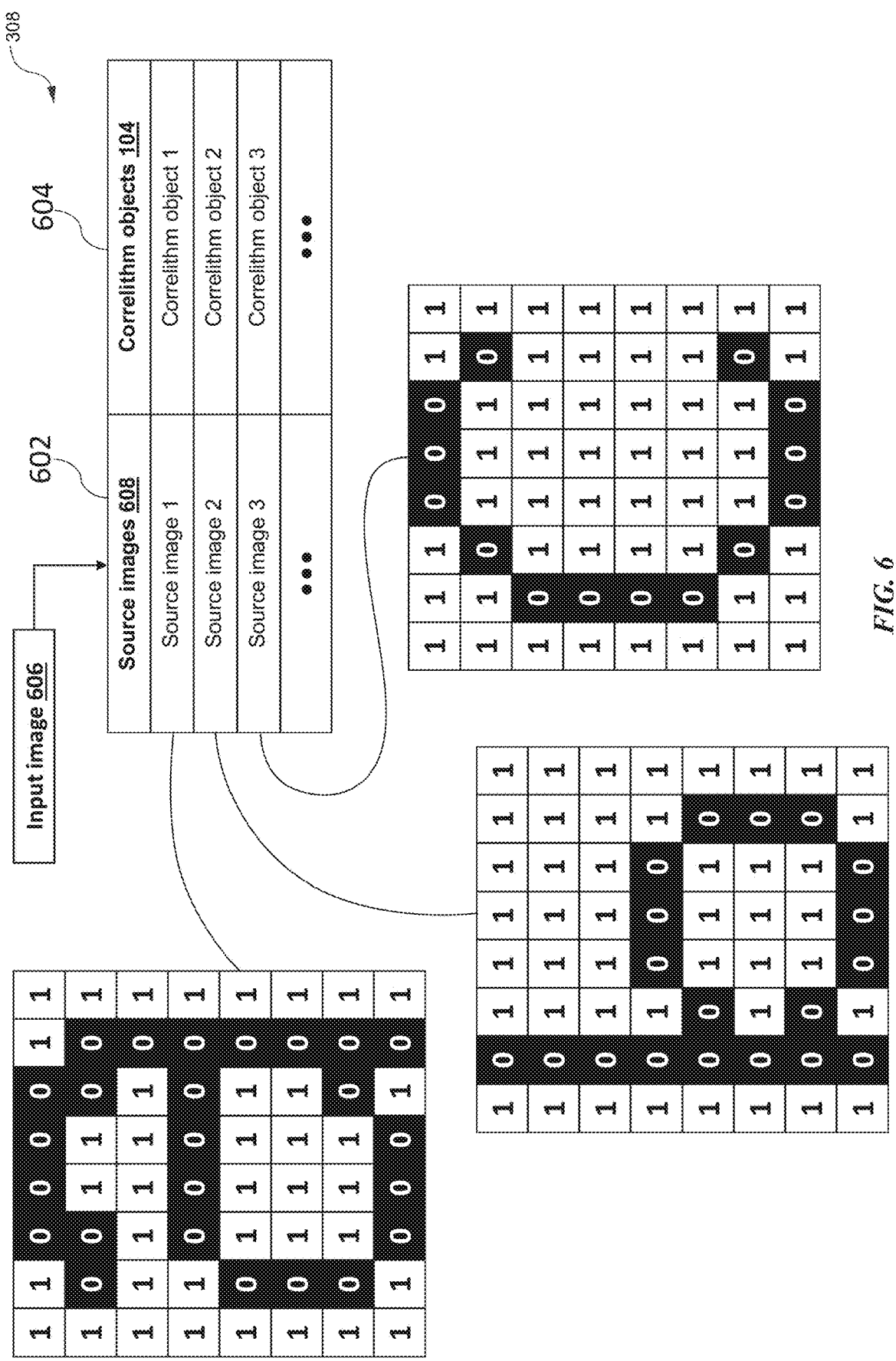
FIG. 6 illustrates an embodiment of a sensor table that stores a mapping between source images and corresponding target correlithm objects.

FIG. 6 illustrates a particular embodiment of a sensor table 308 configured with a first column 602 that includes a number of source images 608 and a second column 604 that includes a number of target correlithm objects 104 corresponding to the source images 608. Although sensor table 308 is described with respect to columns 602 and 604, one of ordinary skill in the art will appreciate that any suitable organization of data or data structure that can map the source images 608 to the correlithm objects 104 can be used in a correlithm object processing system employing sensor 302.

In general, sensor table 308 is used by a correlithm object processing system employing sensor 302 to map or link source images 608 and correlithm objects 104. For example, sensor 302 may receive an input image 606, find a source image 608 that most closely matches the input image 606, and output a corresponding target correlithm object 104.

Source images 608 in column 602 may have any appropriate type of format including, such as, joint photographic experts group (JPEG), bitmap, portable network graphics (PNG). In some embodiments, each source image 608 in column 602 has a bitmap format and includes an n-pixel array. For example, each source image 608 may comprise an 8×8 array of pixels (64-pixel array), an 8×9 array of pixels (72-pixel array), an 9×9 array of pixels (81-pixel array), or any other suitable arrays of pixels. As illustrated in FIG. 6, column 602 comprises three source images 608, namely source image 1, source image 2, and source image 3. In this example, source image 1, source image 2, and source image 3 are configured to store the letters "a," "b," and "c," respectively. Source image 1, source image 2, and source image 3 each includes an 8×8 array of pixels. Each pixel in a source image 608 may be configured to store two or more colors. For example, in some embodiments, each pixel in a source image 608 may be configured to store either one of two colors, namely black and white. Each color stored in a pixel of a source image 608 may be indicated by a binary value. For example, a black pixel of a source image 608 may be indicated by the number "0" and a white pixel of the source image 608 may be indicated by the number "1." As illustrated, source image 1 includes a first set of black pixels that are each indicated by the number "0" and form a shape of the letter "a." Source image 2 includes a second set of black pixels that are each indicated by the number "0" and form a shape of the letter "b." Source image 3 includes a third set of black pixels that are each indicated by the number "0" and form a shape of the letter "c."

Target correlithm objects 104 in column 604 may each include an m-bit digital word of binary values. For example, they may comprise 64-bit, 128-bit, or 256-bit digital words comprising a binary string of values. The number of bits in each correlithm object 104 of column 604 may be the same as or different from the number of pixels in each source image 608 of column 602. For example, a source image 608 may comprise a 64-pixel array while a corresponding correlithm object 104 may comprise a 128-bit digital word of binary values. As another example, a source image 608 may comprise a 256-pixel array while a corresponding correlithm object 104 may comprise a 256-bit digital word of binary values.

The first column 602 and the second column 604 are each illustrated as having three entries for illustrative purposes only, and they may have any suitable number of entries.

As noted before, sensor table 308 may be used by a sensor 302 to map or link source images 608 and target correlithm objects 104. For example, sensor 302 may receive an input image 606, find a source image 608 that closely matches the input image 606, and output a corresponding correlithm object 104. A non-limiting example is provided below in greater detail to illustrate how sensor 302 implements process flow 700 to emulate a correlithm object processing system to identify a target correlithm object 104 corresponding to an input image 606.

Figure 7:
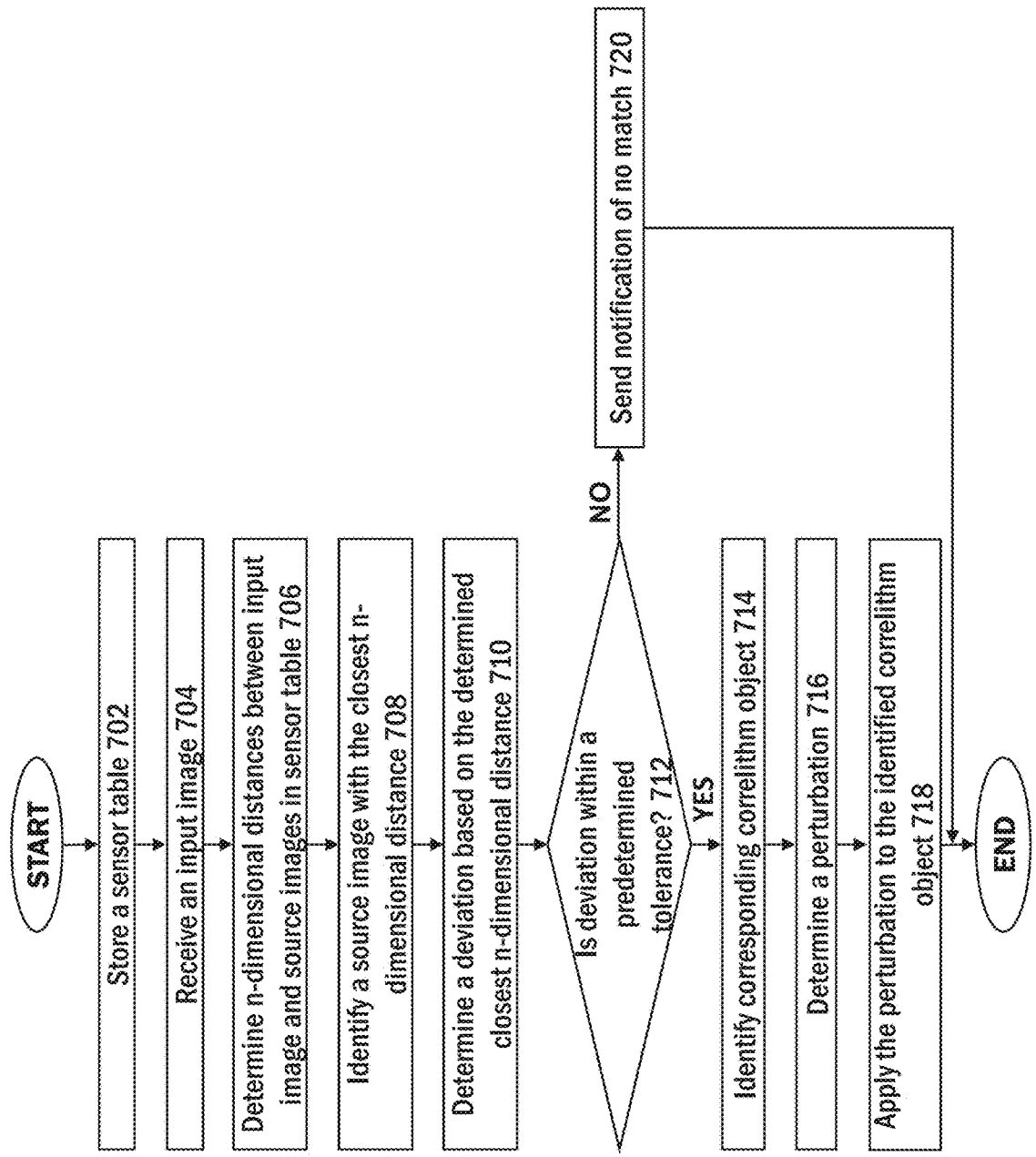
FIG. 7 presents a flow diagram illustrating an embodiment of a process of mapping source images to target correlithm objects.

FIG. 7 presents a flow diagram 700 illustrating a process performed by a correlithm object processing system employing a sensor 302 implemented in a computer architecture 500. Upon starting the process, the correlithm object processing system stores sensor table 308 at step 702. In some embodiments, sensor table 308 is configured with a first column 602 that includes a number of source images 608 and a second column 604 that includes a number of corresponding correlithm objects 104. Each source image 608 in column 602 may have a bitmap format and comprises an n-pixel array of binary values. For example, each source image 608 may include an 8×8 array of pixels, wherein each pixel is associated with a binary value of either "1" or "0." Each target correlithm object 104 in column 604 may include an m-bit digital word of binary values. Note that the number of bits in each target correlithm object 104 of column 604 may be the same as or different from the number of pixels in each source image 608 of column 602.

Figure 8:
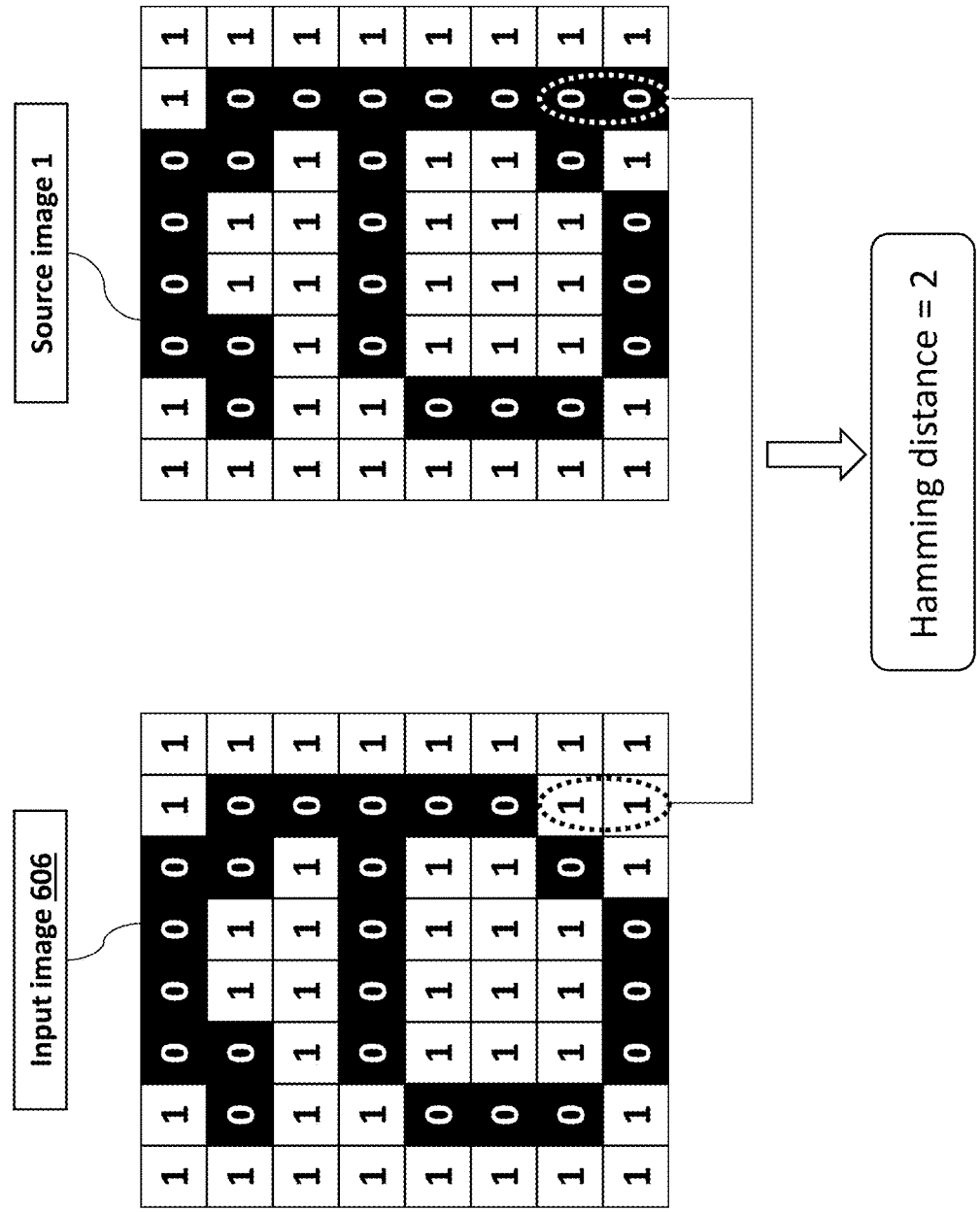
FIG. 8 illustrates an embodiment of computing a Hamming distance between two images.

At step 704, sensor 302 receives an input signal comprising a data sample (e.g., an input image 606). In one embodiment, sensor 302 may obtain the input signal in real-time from a peripheral device (e.g. a camera). In another embodiment, sensor 302 may obtain the input signal from a memory or database. The input signal may be in any suitable data type or format. In some embodiments, the input signal includes an input image 606 having a bitmap format and comprising an n-pixel array of binary values. For example, sensor 302 may receive an input image 606 as illustrated in FIG. 8. As shown in FIG. 8, input image 606 includes an 8×8 array of pixels, wherein each pixel is configured to store a black color associated with the number "0" or a white color associated with the number "1." The black pixels of the input image 606 form a shape resembling the letter "a" with certain distortion. For example, referring to FIG. 8, the input image 606 may be originated from a distorted image such that two pixels located close to the right bottom corner of input image 606 have changed from a black color to a white color. Accordingly, the binary values associated with the two pixels have changed from "0" to "1" as illustrated.

Then, sensor 302 compares the input image 606 to each of the source images 608 and determines a source image 608 in column 602 that most closely matches the input image 606. To determine a source image 606 that most closely matches the input image 606, sensor 302 may first determine the similarity between the input image 606 and each of the source images 608. As noted before, when determining the similarity of two correlithm objects 104, the correlithm object processing system computes an n-dimensional distance (e.g., Hamming distance, Minkowski distance, or other suitable distance) between the two correlithm objects 104. With respect to calculating a Hamming distance, as described above with respect to at least FIG. 1, the determined n-dimensional distances are based on differences between the binary values representing the two correlithm objects 104. In other words, the n-dimensional distance between two correlithm objects 104 can be determined based on how many individual bits differ between the correlithm objects 104. Here, like determining the n-dimensional distance between two correlithm objects 104, sensor 308 may also determine a distance between the input image 606 and a source image 608.

When comparing the input image 606 to each of the source images 608, the sensor 302 may determine n-dimensional or n-pixel distances between the input image 606 and each of the source images 608 in column 602 (step 706). The n-dimensional distances may be Hamming distances that are determined based on differences between the binary values (e.g., "0" or "1") associated with the pixels of the input image 606 and the binary values associated with the pixels of each of the source images 608. For example, sensor 302 may determine a number of pixels that differ between the input image 606 and each of the source images 608. Referring to FIG. 8, sensor 302 compares the input image 606 to source image 1 and determines that only the two pixels in the bottom right corner of the input image 606 differ from those in source image 1. Accordingly, sensor 302 computes a first Hamming distance of 2 for source image 1 with respect to the input image 606. Sensor 302 may continue to compute Hamming distances for other source images 608 with respect to the input image 606. For example, sensor 302 may compute a second Hamming distance of 23 for source image 2 with respect to the input image 606 and a third Hamming distance of 17 for source image 3 with respect to the input image 606. Sensor 302 may determine n-dimensional distances between the input image 606 and each of the source images 608 in column 602 and identify a source image 608 with the closest n-dimensional distance to the input image 606 (step 708). For example, sensor 302 may identify source image 1 with the closest Hamming distance to the input image 606.

Execution then proceeds to step 710 where a deviation between the input image 606 and the identified source image 608 is determined. The deviation represents a measurement of a difference between the input image 606 and the identified source image 608. The deviation may be determined in various ways. In some embodiments, the deviation is determined as the n-dimensional distance between the input image 606 and the identified source image 608. Continuing with the above example, source image 1 is identified with the closest Hamming distance of 2 with respect to the input image 606. Accordingly, a deviation between source image 1 and the input image 606 is determined as 2.

At step 712, process 700 determines whether the determined deviation is within a predetermined tolerance. If the determined deviation is within the predetermined tolerance, the identified source image 608 may be deemed as a "good" match to the input image 606. In some embodiments, the tolerance may be determined based on a standard deviation with respect to the input image 606 as described in greater detail below with reference to FIG. 9. Generally, the tolerance may be defined as a core distance for the input image 606.

Figure 9:
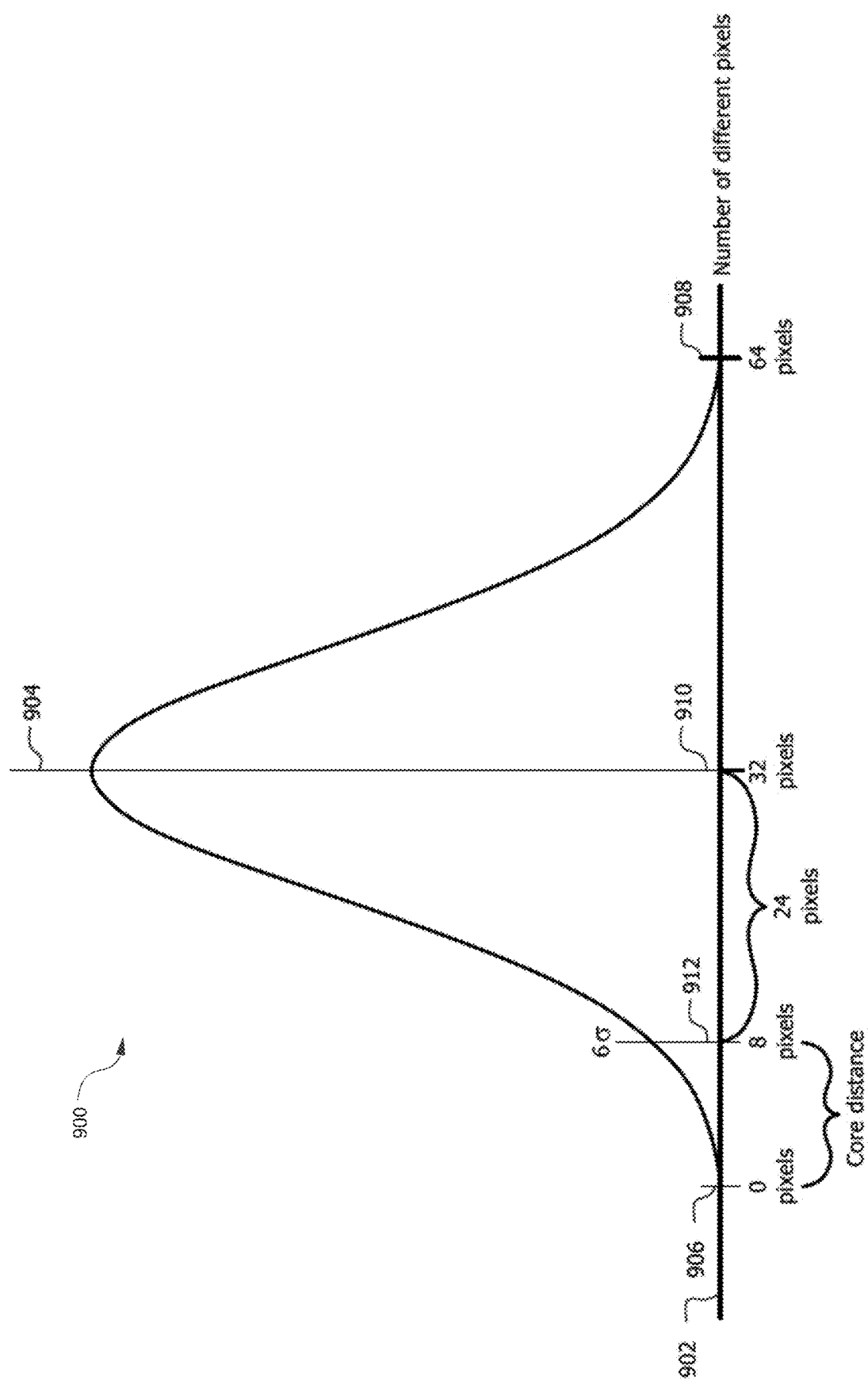
FIG. 9 illustrates an embodiment of a graph of a probability distribution for matching a random source image with an input image.
Figure 10:
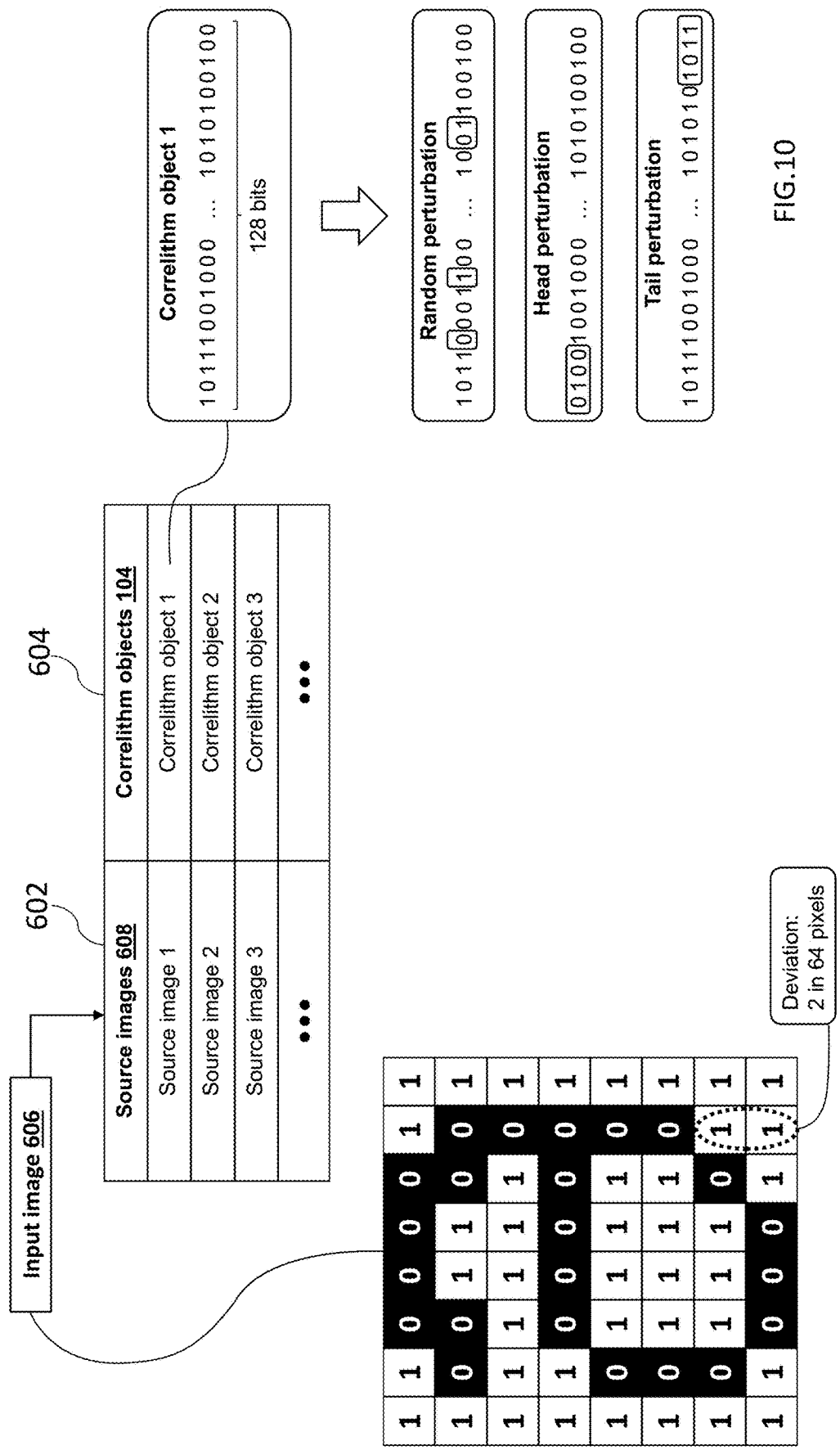
FIG. 10 illustrates an embodiment of applying a perturbation to a target correlithm object.

FIG. 9 generally describes how a core distance may be defined for an input image 606. FIG. 9 illustrates an embodiment of a graph of a probability distribution 900 for matching a random source image 608 with a particular input image 606. Axis 902 indicates the number of pixels that are different between a random source image 608 with a particular input image 606. Axis 904 indicates the probability associated with a particular number of pixels being different between a random source image 608 and a particular input image 606.

As an example, FIG. 9 illustrates the probability distribution 900 for matching input image 606 in a 64-dimensional (i.e., 64-pixel) space. In one embodiment, the probability distribution 900 is approximately a Gaussian distribution. As the number of dimensions (i.e., pixels) in the n-dimensional space increases, the probability distribution 900 starts to shape more like an impulse response function. In other examples, the probability distribution 900 may follow any other suitable type of distribution.

Location 906 illustrates an exact match between a random source image 608 with a particular input image 606. As shown by the probability distribution 900, the probability of an exact match between a random source image 608 with a particular input image 606 is extremely low. In other words, when an exact match occurs the event is most likely deliberate and not a random occurrence.

Location 908 illustrates when all of the pixels between the random source image 608 with the particular input image 606 are different. In this example, the random source image 608 and the particular input image 606 have 64 pixels that are different from each other. As shown by the probability distribution 900, the probability of all the pixels being different between the random source image 608 and the particular input image 606 is also extremely low.

Location 910 illustrates an average number of pixels that are different between a random source image 608 and the particular input image 606. In general, the average number of different pixels between the random source image 608 and the particular input image 606 is equal to $$\frac{n}{2},$$

where 'n' is the number of dimensions (i.e., pixels) in the n-dimensional space. In this example, the average number of pixels that are different between a random source image 608 and the particular input image 606 is 32 pixels.

Location 912 illustrates a cutoff region that defines a core distance for an input image core. The core distance defines the maximum number of pixels that can be different between a random source image 608 and the input image 606 to consider the random source image 608 as a "good" match to the input image 606. In this example, the cutoff region defines a core distance equal to six standard deviations away from the average number of pixels that are different between a random source image 608 and the particular input image 606. In general, the standard deviation is equal to $$\sqrt{\frac{n}{4}},$$

where 'n' is the number of pixels in the input image 606. In this example, the standard deviation of the 64-pixel input image 606 is equal to 4 pixels. This means the cutoff region (location 912) is located 24 pixels away from location 910 which is 8 pixels away from the location 906. In other words, the core distance is equal to 8 pixels. In other examples, the cutoff region that defines the core distance may be equal any other suitable value. For instance, the cutoff region may be set to 2, 4, 8, 10, 12, or any other suitable number of standard deviations away from location 910.

Referring back to FIG. 7, process 700 proceeds to step 714 if the determined deviation is within the predetermined tolerance. Otherwise, process 700 proceeds to step 720 if the determined deviation is not within the predetermined tolerance.

At step 714, sensor 302 identifies a correlithm object 104 in column 604 that corresponds to the previously identified source image 608 with the closest n-dimensional distance to the input image 606 if the determined deviation is within the predetermined tolerance. Continuing with the above example, sensor 302 may identify source image 1 with the closest Hamming distance of 2 to the input image 606. Sensor 302 then determines that the deviation is 2 pixels for source image 1 and that the deviation is within the predetermined tolerance of 8 pixels as determined above with reference to FIG. 9. Sensor 302 may then identify correlithm object 1 that corresponds to source image 1 as illustrated in sensor table 308. Note that in the above example, although source image 1 is deemed as a "good" match to the input image 606 because its deviation is within the predetermined tolerance, source image 1 is not an exact match to the input image 606. Simply identifying and outputting a correlithm 104 that corresponds to source image 1 does not take into account the deviation and neglects the fact that correlithm object 104 is actually corresponding to source image 1 instead of the input image 606. In some embodiments of the present disclosure, the deviation between the identified source image 608 and the input image 606 may be carried forward to the correlithm object 104 corresponding to the identified source image 608. To carry forward the deviation, process 700 proceeds to step 716 to determine a perturbation to be applied to the correlithm object 104 corresponding to the identified source image 608. The perturbation may be determined as a number of bits in the correlithm object 104 that needs to be modified to represent the determined deviation. In general, the number of bits in the correlithm object 104 that needs to be perturbed is proportional to the deviation between the identified source image 608 and the input image 606.

In some embodiments, the perturbation is determined as follows. Sensor 302 first computes a ratio of the closest determined n-dimensional distance to a total number of pixels in the input image 606. Using the above example, sensor 302 may identify source image 1 with the closest Hamming distance of 2 to the input image 606 and compute a ratio of the Hamming distance (i.e., 2) to the number of pixels (i.e., 64) in source image 1. Accordingly, the ratio is computed as 1/32. Then, sensor 302 determines a total number of bits in the correlithm object 104 corresponding to the identified source image 608. For example, sensor 302 may determine that the correlithm object 104 has a total number of 128 bits. Next, sensor 302 applies the previously determined ratio to the total number of bits in the correlithm object 104 to determine a number of bits in the correlithm object 104 that needs to be perturbed. For example, sensor 302 applies the previously determined ratio of 1/32 to the total number of 128 bits in the correlithm object 104 and determines that a number of 4 bits in the correlithm object 104 needs to be perturbed. In some embodiments, sensor 302 may randomly perturb the determined number of bits in the correlithm object 104. Continuing with the example, referring to FIG. 10, sensor 302 may randomly perturb 4 of the 128 bits of the correlithm object 104. In alternative embodiments, sensor 302 may perturb the determined number of bits at the head or the tail of the binary string representing the correlithm object 104. Sensor 302 may perturb the determined number of bits in the correlithm object 104 by changing the binary value for each of the determined number of bits. For example, if a first bit of the determined number of bits originally has the value of "0," sensor 302 changes its value to "1." If a second bit of the determined number of bits originally has the value of "1," sensor 302 changes its value to "0." By determining the perturbation based on the deviation for the input image 606 and applying the perturbation to the output correlithm object 104, a corrrelithm processing system employing sensor 308 is able to carry the uncertainty of the input image 660 forward to the output correlithm object 104. This allows the system to output a correlithm object 104 that better corresponds to the input image 606.

A user device 100 employs a sensor 302 implementing process 700 to allow the user device 100 to compare data samples even when the input data sample does not exactly match any known or previously stored input values. The user device 100 is able to determine how similar the data samples (e.g., images) are to each other even when the data samples are not exact matches. In addition, the user device 100 is able to quantify how similar data samples are to one another by determining n-dimensional distances between the data samples. The ability to determine how similar data samples are to each other is unique and distinct from conventional computers that can only perform binary comparisons to identify exact matches. This ability provides a technical advantage by allowing the system to identify and compare data samples regardless of whether an exact match has been previous observed or stored. In other words, using the sensor 302 implementing process 700 the user device 100 is able to identify similar data samples to an input data sample in the absence of an exact match. This functionality is unique and distinct from conventional computers that can only identify data samples with exact matches.

As described above, FIGS. 6-10 illustrate a process for converting an input image 606 to a correlithm object 104.

The process involves determining n-dimensional (or n-pixel) distances between the input image 606 and each source image 608, determining a source image 608 with the closest n-dimensional distance, and identifying a correlithm object 104 corresponding to the determined source image 608. Note that in the discussion with reference to FIGS. 6-10, the input image 606 and the source images 608 have the same number of pixels. For example, referring to FIG. 8, the input image 606 includes an 8×8 array of pixels. The source images 608, for example source image 1-3, each includes an 8×8 array of pixels. The n-dimensional distance may be a Hamming distance which can be computed by determining a number of pixels that differ between the input image 606 and a source image 608. The Hamming distance is determined based on the fact that the input image 606 and the source images 608 have the same number of pixels. However, in the real world, an input image 606 does not always have the same number of pixels with the source images 608. This creates a technical challenge in determining a similarity between an input image 606 and a source image 608.

Figure 11:
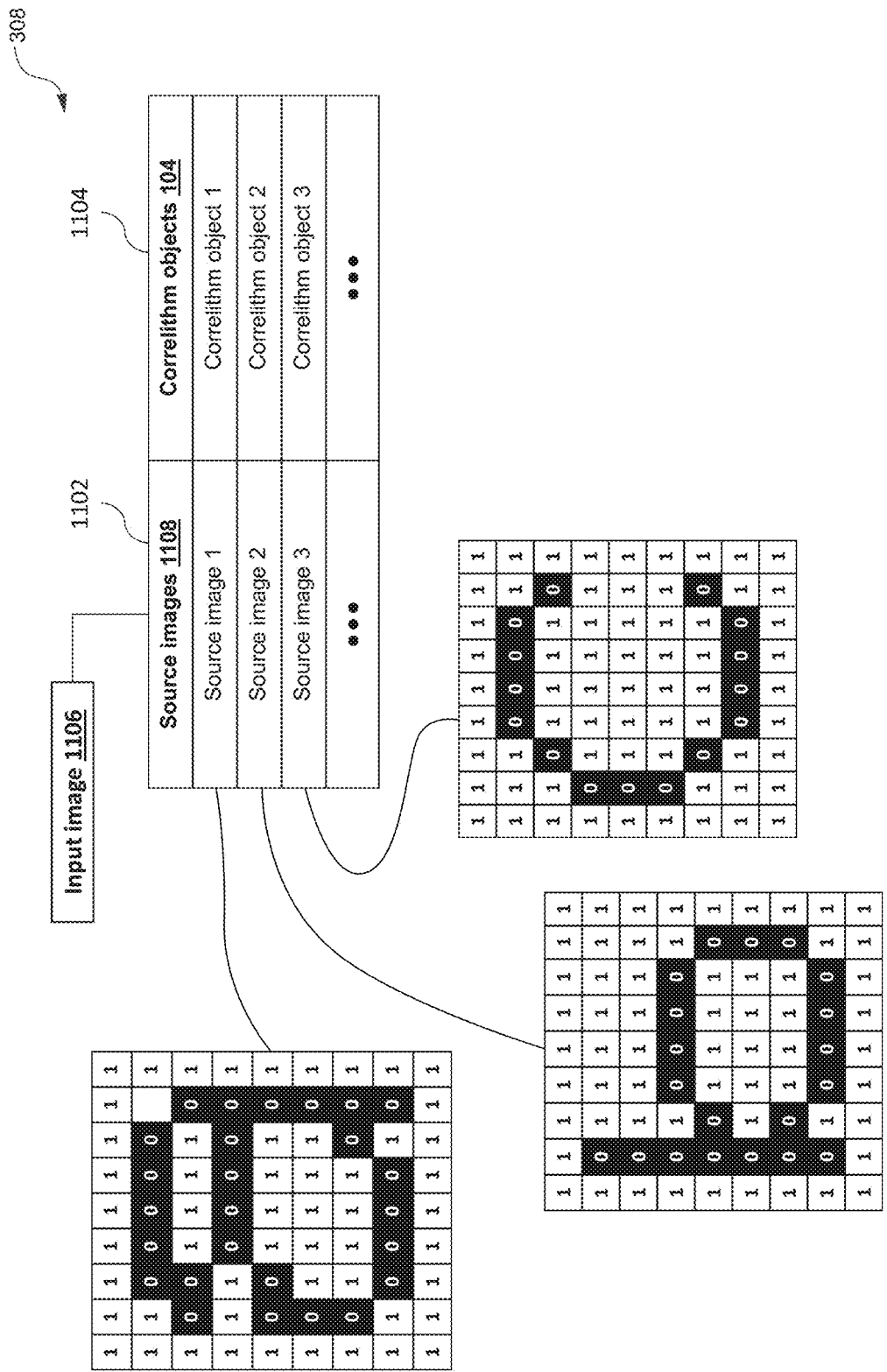
FIG. 11 illustrates an embodiment of a sensor table that stores a mapping between source images and corresponding target correlithm objects.

For example, referring to FIG. 11, sensor table 308 may be configured with a first column 1102 that includes a number of source images 1108 and a second column 1104 that includes a number of corresponding correlithm objects 104. Each source image 1108 in column 1102 may have a bitmap format and comprises an n-pixel array of binary values. For example, each source image 1108 may include an 9×9 array of pixels, wherein each pixel is associated with a binary value of either "1" or "0." Each correlithm object 104 in column 1104 may include an m-bit digital word of binary values. Note that the number of bits in each correlithm object 104 of column 1104 may be the same as or different from the number of pixels in each source image 1108 of column 1102. Sensor table 308 may be used by a correlithm object processing system employing sensor 302 to map or link source images 1108 and correlithm objects 1104. For example, sensor 302 may receive an input image 1106, find a source image 1108 that most closely matches the input image 606, and output a corresponding correlithm object 104. However, referring to FIG. 12, the input image 1106 may include an array of pixels that is much larger than the array of pixels included in a source image 1108, for example source image 1 in column 1102. Here, it is difficult to compare the input image 1106 with source image 1 and determine an n-dimensional (n-pixel) distance between them because they have difference number of pixels.

The present disclosure provides a solution to this technical challenge as described below in greater detail with reference to FIGS. 13-16. In general, the solution is to move a virtual focus block over the input image 1106 and identify a local area that most closely matches a source image 1108 that is being compared to the input image 1106. Note that the local area identified by the virtual focus block should have the same number of pixels with the source images 1108 in order to compute an n-dimensional distance between the local area and the source image 1108. A correlithm processing system implementing the solution is similar to the foveal system of human eyes. When a person sees a large image that includes a local region of interest, the person may not focus on the local region at the beginning. The person may move eyes a bit and see if the recognition of the region improves. If so, the person moves the eyes again until the recognition stops improving. Similarly, the process of moving the virtual focus block to bring a local region of interest into the focus is also a gradual process. The concept of foveal focus can be very effectively utilized in higher levels of correlithm artificial intelligence systems. For example, we can build a high resolution correlithm object processing system for a restricted field of observation of an information gathering system. A part of the restricted field of observation is concerned with the identification of relatively sparse points of interest on which the correlithm processing system may choose to focus the high-resolution region (i.e. the foveal region). The benefit of focusing the high-resolution region is that it uses significantly fewer resources than resolving the whole restricted field. The foveal region receives the highest concentration of system resources, which are used for detailed observation. Outside the foveal region, much lower levels of system resources are needed for relatively simple tasks, such as the directing of attention.

Figure 13:
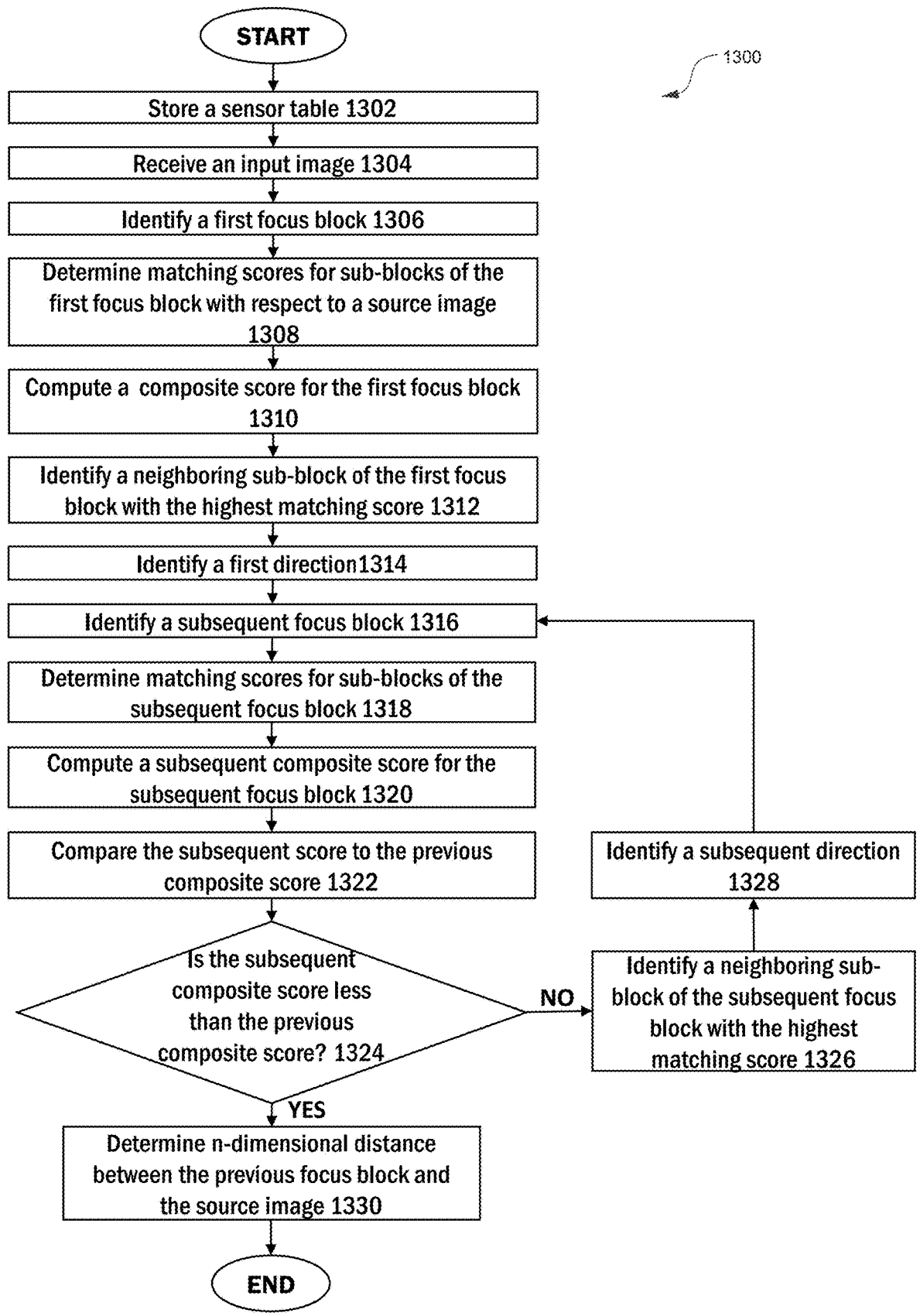
FIG. 13 presents a flow diagram illustrating an embodiment of a process of emulating a foveal mechanism in a correlithm object processing system.

FIG. 13 presents a flow diagram 1300 illustrating a process performed by a correlithm object processing system employing a sensor 302 implemented in a computer architecture 500. Upon starting the process, the correlithm object processing system stores table 308 at step 1302. In some embodiments, sensor table 308 is configured with a first column 1102 that includes a number of source images 1108 and a second column 1104 that includes a number of corresponding correlithm objects 104. Each source image 1108 in column 1102 may have a bitmap format and comprises an n-pixel array of binary values. For example, as illustrated in FIG. 11, each source image 1108 may include an 9×9 array of pixels, wherein each pixel is associated with a binary value of either "1" for white color or "0" for black color. Each correlithm object 104 in column 1104 may include an m-bit digital word of binary values. Note that the number of bits in each correlithm object 104 of column 1104 may be the same as or different from the number of pixels in each source image 1108 of column 1102.

Figure 12:
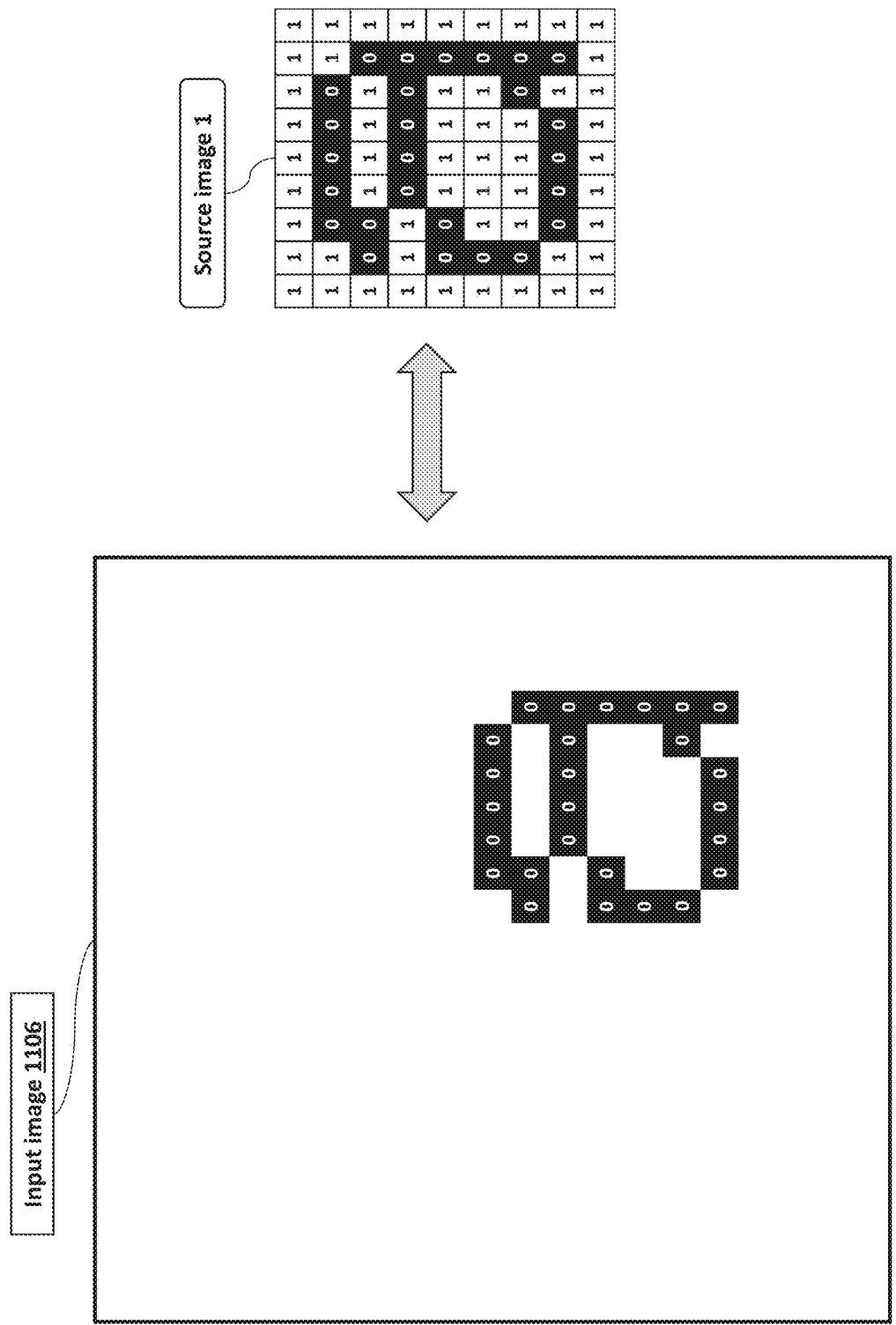
FIG. 12 illustrates an embodiment of a comparison between an input image and a source image.

At step 1304, sensor 302 receives an input signal representing a data sample. In one embodiment, sensor 302 may obtain the input signal in real-time from a peripheral device (e.g. a camera). In another embodiment, sensor 302 may obtain the input signal from a memory or database. The input signal may be in any suitable data type or format. In some embodiments, the input signal includes an input image 1106 having a bitmap format and comprising an n-pixel array of binary values. For example, sensor 302 may receive an input image 1106 as illustrated in FIG. 12. As shown in FIG. 12, input image 1106 includes an array of pixels having a size that is much larger than a source image 1108, for example source image 1. The black pixels of the input image 1106 form a shape resembling the letter "a" located in a local area close to the right bottom of the input image 1106.

Execution proceeds to step 1306 where sensor 302 identifies a first focus block 1402 of the input image 1106. In some embodiments, the first focus block 1402 is located close to a central area of the input image 1106. For example, referring to FIG. 14, sensor 302 may identify focus block 1402 located close to the central area of the input image 1106. In some embodiments, the first focus block 1402 comprises an n-pixel array including the same number of pixels as the source image 1108. For example, same as source image 1, focus block 1402 comprises a 9×9 array of pixels. Note that focus block 1402 only includes a portion of the letter "a" in the input image 1106. In some embodiments, the first focus block 1402 comprises a number of sub-blocks. The sub-blocks may include at least a central block 1404 and a number of neighboring sub-blocks 1406. For example, focus block 1402 comprises 9 sub-blocks including a central sub-block 1404 and 8 neighboring sub-blocks 1406. In this example, each sub-block includes a 3×3 array of pixels.

Figure 14:
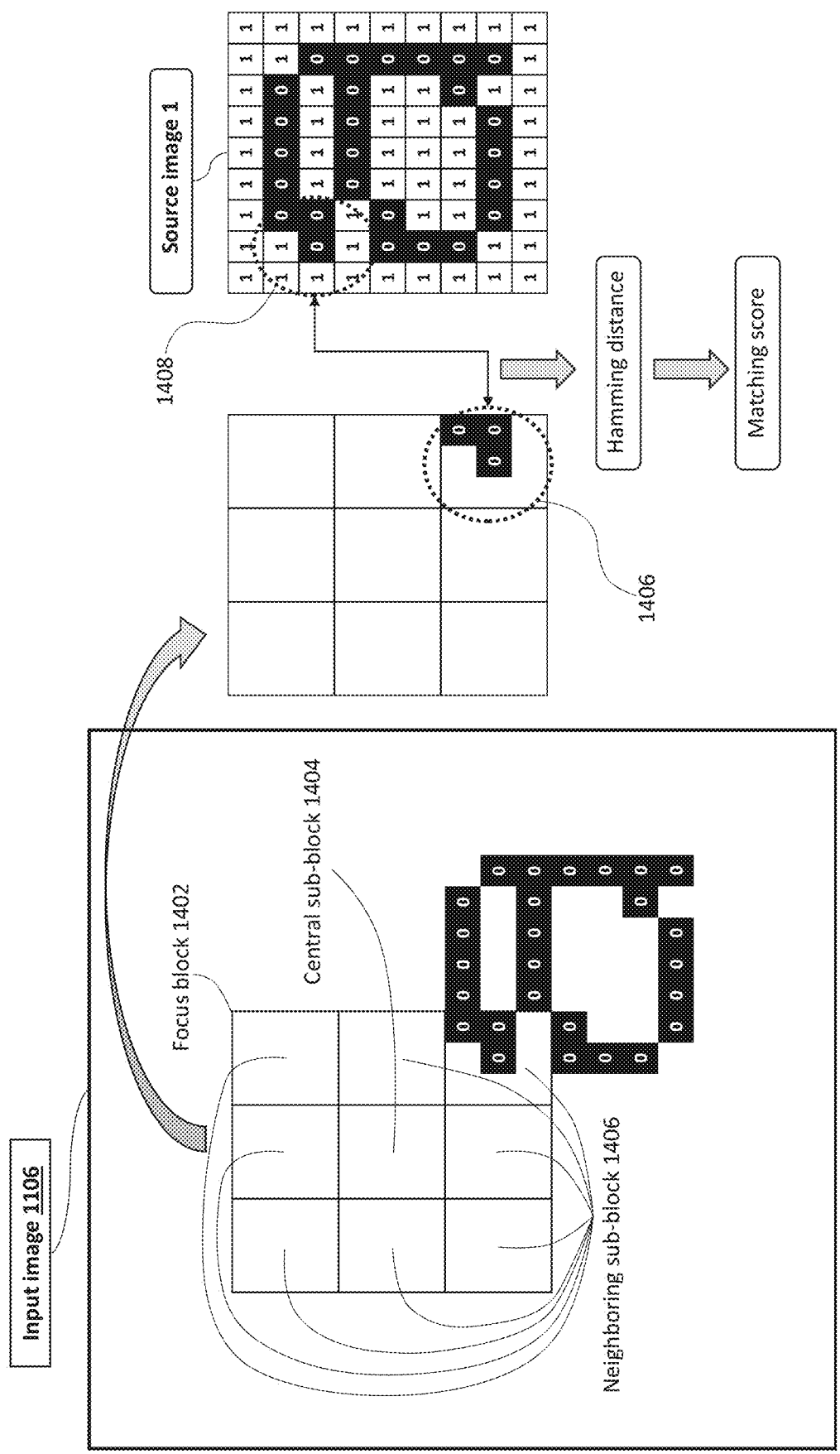
FIG. 14 illustrates an embodiment of a comparison between a focus block of an input image with a source image.
Figure 15:
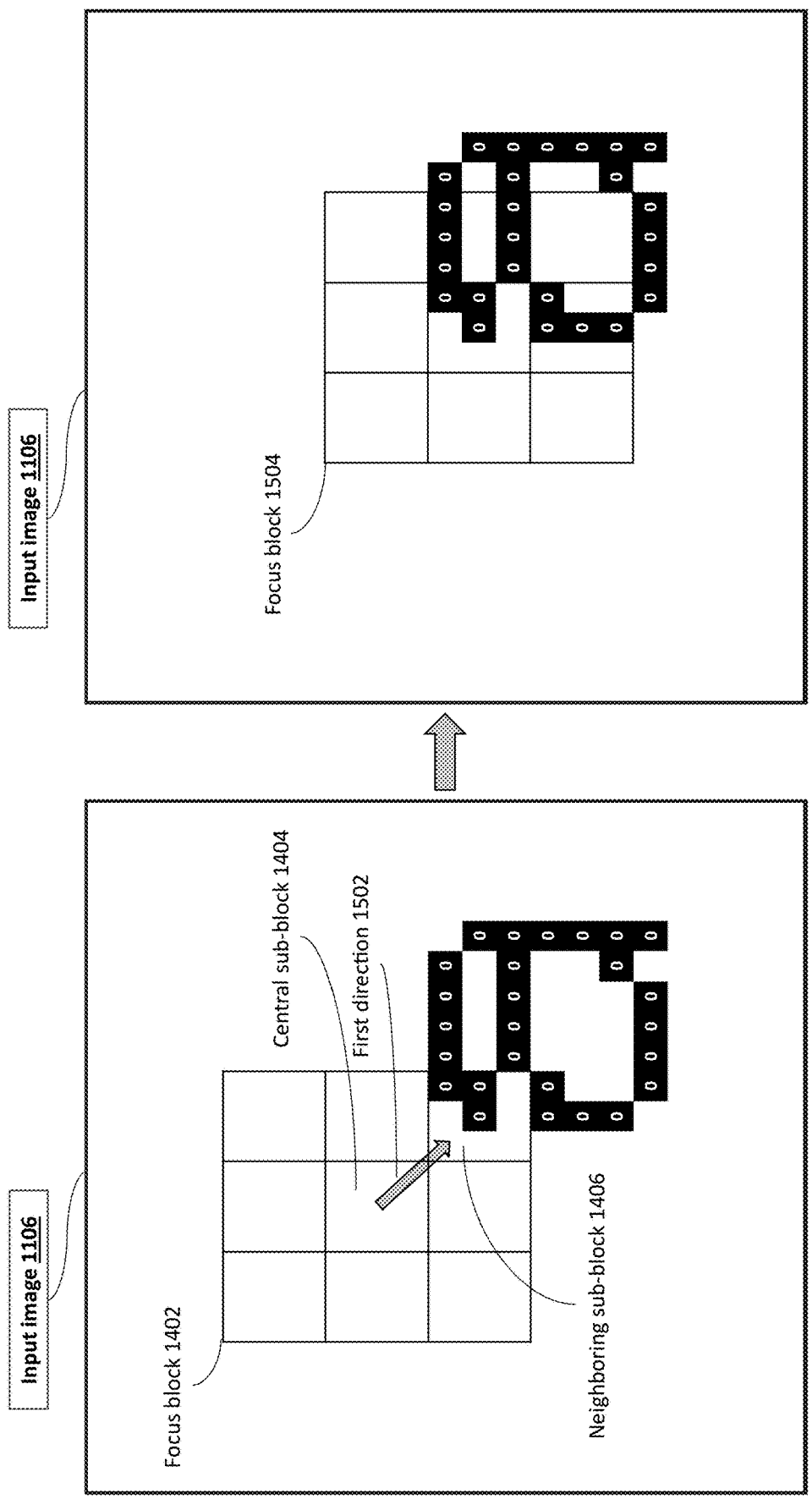
FIG. 15 illustrates an embodiment of moving a focus block in an input image.
Figure 16:
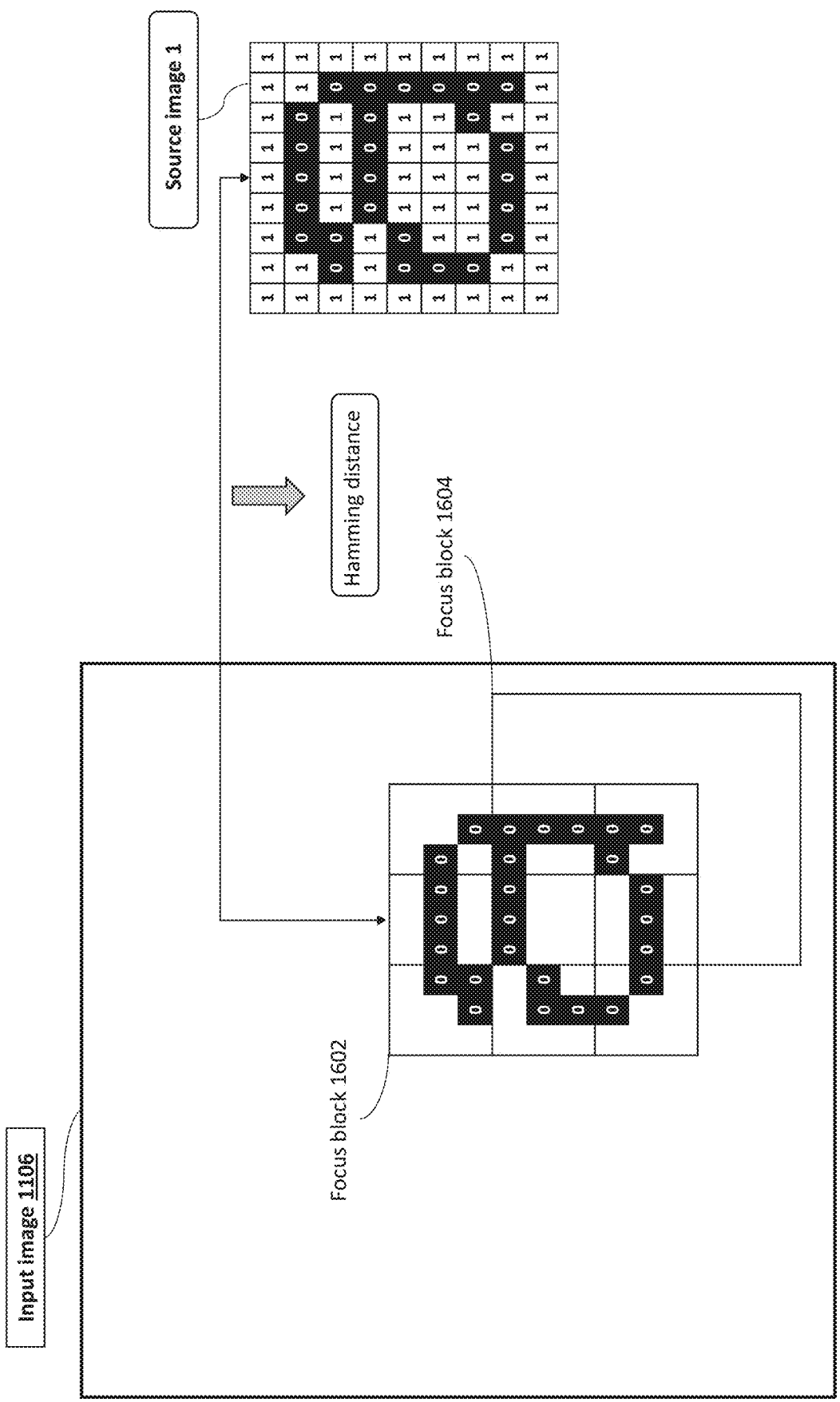
FIG. 16 illustrates an embodiment of identifying a focus block in an input image that mostly closely matches a source image.

Referring back to FIG. 13, at step 1308, process 1300 determines matching scores for the sub-blocks of the first focus block 1402 with respect to the source image 1108 that is being compared with the input image 1106. For example, referring to FIG. 14, sensor 302 may determine a matching score for each of the 9 sub-blocks of focus block 1402 with respect to source image 1. In some embodiments, the matching score for a sub-block with respect to a source image 1108 is determined based on a feature detection method. Taking the right bottom sub-block 1406 of focus block 1402 for example, sensor 302 may identify a local patch 1408 of the source image 1108 that most closely matches the right bottom sub-block 1406. In some embodiments, sensor 302 may use a local feature detection method to detect and extract a local feature that mostly closely matches the pattern within the right bottom sub-block 1406 as illustrated in FIG. 14. Then, sensor 302 may identify a local patch 1408 of the source image 1108 that at least includes the detected local feature. In some embodiments, the identified local patch 1408 of the source image 1108 includes a same number of pixels as sub-block 1406. For example, the right bottom sub-block 1406 includes a 3×3 array of pixels and the identified local patch 1408 also includes a 3×3 array of pixels as illustrated in FIG. 14.

Next, sensor 302 may determine an n-dimensional (n-pixel) distance between the sub-block 1406 and the identified local patch 1408. The n-dimensional distance may be a Hamming distance, a Minkowski distance, or other suitable distance. With respect to calculating a Hamming distance, as described above with respect to at least FIG. 8, the n-dimensional distance is determined based on differences between the binary values (e.g., "0" or "1") associated with the pixels of the sub-block 1406 and the binary values associated with the pixels of the local patch 1408 identified in source image 1108. Sensor 302 then computes a matching score for the sub-block 1406 with respect to the identified local patch 1408 based on the calculated n-dimensional distance. In some embodiments, the matching score is computed as being inversely proportional to the determined n-dimensional distance. For example, a smaller n-dimensional distance indicates a higher matching score for the sub-block 1406. Referring back to FIG. 13, after determining a matching score for each of the sub-blocks 1406, process 1300 proceeds to step 1310.

At step 1310, process 1300 computes a composite score for the first focus block 1402. In some embodiments, the composite score for the first focus block 1402 is computed by adding up the matching score for each of the sub-blocks of the first focus block 1402. For example, sensor 302 may determine a matching score for each of the sub-blocks 1406 of focus block 1402 and sum the matching scores to generate a composite score for focus block 1402. In some embodiments, sensor 302 may store the composite score in a memory or database for subsequent operations.

At step 1312, process 1300 identifies a neighboring sub-block of the first focus block 1402 with the highest matching score. For example, sensor 302 may compare the matching scores for all the neighboring sub-blocks 1406 of focus block 1402 and determine that the right bottom sub-block 1406 has the highest matching score. After identifying the neighboring sub-block with the highest matching score, process 1300 proceeds to step 1314.

At step 1314, process 1300 determines a direction to move a virtual focus block 1402 in order to identify a subsequent block of the input image 1106. In some embodiments, the direction is determined by choosing a direction that directs from the central sub-block of the first focus block to the neighboring sub-block 1406 with the highest matching score. For example, referring to FIG. 15, a direction 1502 is determined such that it directs from the central sub-block 1404 of focus block 1402 to the right bottom neighboring sub-block 1406 with the highest matching score. The direction is determined such that it represents a tendency of improved recognition of an area of interest (e.g., the letter "a") in the input image 1106.

Process 1300 then proceeds to step 1316 where a second focus block 1504 is identified. The second focus block 1504 may be a predetermined distance away from the first focus block 1402 along the direction 1502 as previously determined in step 1314. Like the first focus block 1402, the second focus block 1504 may also comprise a plurality of sub-blocks including at least a central sub-block and a number of neighboring sub-blocks. In some embodiments, the predetermined distance is a sub-block of the first focus block 1402. For example, referring to FIG. 15, sensor 302 identifies a second focus block 1504 which is a sub-block (i.e., 3 pixels) away from the first focus block 1402 along direction 1502. Note that in this example, the second focus block 1504 and the first focus block 1402 are partially overlapping. However, in other embodiments, the first focus block and the second focus block may not be overlapping. After identifying a second focus block, process 1300 proceeds to step 1318.

At step 1318, process 1300 determines a matching score for each of the sub-blocks of the second focus block 1504. For example, sensor 302 may determine a matching score of each of the sub-blocks of focus block 1504. With respect to computing a matching score as described above with respect to step 1308, a matching score for each of the sub-blocks of focus block 1504 may be computed by identifying a local patch of the input image 1106 that most closely matches the sub-block of the focus block 1504, determining an n-dimensional distance between the sub-block and the identified local patch, and computing a matching score based on the determined n-dimensional distance.

After computing a matching score for each of the sub-blocks of the second focus block, process 1300 proceeds to step 1320 to compute a second composite score for the second focus block. The second composite score is determined by summing up the matching score of each of the sub-blocks of the second focus block. For example, sensor 302 may determine a matching score for each of the sub-blocks of focus block 1504 and compute a composite score by adding up the matching score for each of the sub-blocks. In some embodiments, sensor 302 may store the composite score in a memory or database for subsequent operations.

At step 1322, process 1300 compares the second composite score computed for the second focus block 1504 to the first or a previous composite score computed for the first focus block 1402. In some embodiments, sensor 302 may retrieve a first composite score and a second composite score previously stored in a memory or a database and compare them. For example, sensor 302 may compare a second composite score computed for focus block 1504 with a first composite score computed for focus block 1402.

Process 1300 then proceeds to step 1324 to determine whether the second composite score computed for the second focus block 1504 is less than the first or a previous composite score computed for the first focus block 1402. If the second composite score is equal to or greater than the first or a previous composite score, process 1300 proceeds to step 1326. If the second composite score is less than the first or a previous composite score, process 1300 proceeds to step 1330. For example, if the second composite score computed for focus block 1504 is equal to or greater than the first composite score computed for focus block 1402, process 1300 proceeds to step 1326. If the second composite score computed for focus block 1504 is less than the first composite score computed for focus block 1402, process 1300 proceeds to step 1330. The second composite score being equal to or greater than the first or a previous composite score means that the second focus block 1504 has a same or better matching with the source image 1108 than the first focus block 1402. On the other hand, the second composite score being less than the first or a previous composite score means that the second focus block 1504 has a worse matching with the source image 1108 than the first focus block 1402.

At step 1326, process 1300 identifies a neighboring sub-block 1406 of the second focus-block 1504 with the highest matching score if the second composite score is equal to or greater than the first or a previous composite score. For example, sensor 302 may determine that the second composite score computed for focus block 1504 is equal to or greater than the first composite score computed for focus block 1402 and identify a neighboring sub-block of focus block 1504 with the highest matching score among the matching scores as determined at step 1318.

Then, process 1300 proceeds to step 1328 where a subsequent direction is determined. The subsequent direction may be determined by choosing a direction that directs from the central sub-block of the second focus block to the neighboring sub-block with the highest matching score. For example, sensor 302 may determine a second direction that directs from the central sub-block of focus block 1504 to a neighboring sub-block with the highest matching score.

After identifying the subsequent direction in step 1328, process 1300 proceeds back to step 1316 to identify a subsequent focus block a predetermined distance away from the second focus block along the direction as determined in step 1328. Process 1300 subsequently executes through steps 1318-1324 to determine a subsequent composite score for the subsequent focus block and determine whether the subsequent composite score is less than the previous composite score. Process 1300 loops through steps 1316-1328 until it is determined that a subsequent composite score is less than a previous composite score. If a subsequent composite score is less than a previous composite score, process 1300 breaks the loop and proceeds to step 1330. At step 1330, process 1300 determines an n-dimensional distance between a previous focus block and the source image 1108. For example, referring to FIG. 16, focus block 1604 may be a subsequent focus block with respect to focus block 1602. Sensor 302 may determine that a composite score computed for focus block 1604 is less than the composite score computed for focus block 1602 and then compute an n-dimensional distance between focus block 1602 and source image 1 that is being compared with input image 1106.

As noted before, process 1300 provide a solution to move a virtual focus block over the input image 1106 and identify a local area that most closely matches a source image 1108 that is being compared to the input image 1106. The process of moving the virtual focus block to bring a region of interest into the focus is a gradual process. For example, sensor 320 implementing process 1300 may move a virtual focus block to identify a first focus block 1402, determine a first direction to move the virtual focus block to identify a second focus block 1504, and determine whether the recognition of the local area of interest improves. Sensor 302 may repeat a portion of the process 1300 until it identifies a focus block 1602 that most closely matches a source image 1108 that is being compared, for example source image 1. Sensor 302 may overstep by moving to another focus block 1604 to see if the recognition improves. Upon determining that the recognition does not improve by moving from focus block 1602 to 1604 (e.g., composite score decreases), sensor 302 determines that focus block 1602 is a best match to source image 1 and computes an n-dimensional distance between focus block 1602 and source image 1. In this way, sensor 302 effectively identify a local area that includes a pattern of interest within a large image. A high resolution correlithm object processing system for an information gathering system can be built to focus on the local area that includes a pattern of interest. The benefit of focusing the high-resolution local region of a large image is that it uses significantly fewer resources than resolving the whole image. For example, resolving the whole image (e.g., input image 1106) which has significantly more pixels than a focus block (e.g., focus block 1402 and 1504) requires more processors and longer processing time for processing the image. Therefore, focusing the high-resolution local region of a large image helps conserve computer resources (e.g., processors, memory) that are otherwise used for processing the area of the image that does not include a pattern of interest.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A device to emulate image mapping in a correlithm object processing system, comprising:
    a memory operable to store a correlithm object mapping table that comprises a plurality of source image elements and a plurality of corresponding target correlithm objects, each of the plurality of source image elements comprising an n-pixel array of binary values, each of the plurality of corresponding target correlithm objects comprising an m-bit digital word of binary values; and
    one or more processors communicatively coupled to the memory and operable to:
        receive an input image element comprising an n-pixel array of binary values;

determine n-dimensional distances between the input image element and each of the plurality of source image elements, wherein the determined n-dimensional distances are based on differences between the binary values representing the input image element and the binary values representing each source image element;

identify a source image element with the closest determined n-dimensional distance to the input image element;

determine a deviation between the input image element and the identified source image element based on the closest determined n-dimensional distance;

determine whether the deviation is within a predetermined tolerance;

in response to determining that the deviation is within the predetermined tolerance, identify a target correlithm object corresponding to the identified source image;

determine a perturbation to be applied to the identified target correlithm object based on the determined deviation; and generate a perturbed correlithm object by applying the determined perturbation to the identified target correlithm object.

2. The device of claim 1, wherein the n-dimensional distance comprises Hamming distance.

3. The device of claim 1, wherein determining n-dimensional distances between the input image element and each of the plurality of source image elements comprises:

for each of the plurality of source image elements, determining a number of pixels that differ between the input image element and the source image element.

4. The device of claim 1, wherein the deviation is determined as the determined n-dimensional distance.

5. The device of claim 1, wherein the predetermined tolerance is determined as a core distance for the input image, wherein the core distance is determined based on a standard deviation with respect to the input image element.

6. The device of claim 5, wherein the standard deviation is determined based on a total number of pixels in the input image element.

7. The device of claim 1, wherein determining a perturbation to be applied to the identified target correlithm object comprises:

computing a ratio of the closest determined n-dimensional distance to a total number of pixels in the input image element;

determining a number of bits in the identified target correlithm object to be perturbed by applying the computed ratio to a total number of bits in the identified target correlithm object; and changing the binary value for each of the determined number of bits in the identified target correlithm object.

8. A non-transitory computer-readable medium comprising logic for emulating image mapping in a correlithm object processing system, the logic, when executed by a processor, operable to:

store a correlithm object mapping table that comprises a plurality of source image elements and a plurality of corresponding target correlithm objects, each of the plurality of source image elements comprising an n-pixel array of binary values, each of the plurality of corresponding target correlithm objects comprising an m-bit digital word of binary values;

receive an input image element comprising an n-pixel array of binary values;

determine n-dimensional distances between the input image element and each of the plurality of source image elements, wherein the determined n-dimensional distances are based on differences between the binary values representing the input image element and the binary values representing each source image element;

identify a source image element with the closest determined n-dimensional distance to the input image element;

determine a deviation between the input image element and the identified source image element based on the closest determined n-dimensional distance;

determine whether the deviation is within a predetermined tolerance;

in response to determining that the deviation is within the predetermined tolerance, identify a target correlithm object corresponding to the identified source image;

determine a perturbation to be applied to the identified target correlithm object based on the determined deviation; and generate a perturbed correlithm object by applying the determined perturbation to the identified target correlithm object.

9. The non-transitory computer-readable medium of claim 8, wherein the n-dimensional distance comprises Hamming distance.

10. The non-transitory computer-readable medium of claim 8, wherein determining n-dimensional distances between the input image element and each of the plurality of source image elements comprises:

for each of the plurality of source image elements, determining a number of pixels that differ between the input image element and the source image element.

11. The non-transitory computer-readable medium of claim 8, wherein the deviation is determined as the determined n-dimensional distance.

12. The non-transitory computer-readable medium of claim 8, wherein the predetermined tolerance is determined as a core distance for the input image, wherein the core distance is determined based on a standard deviation with respect to the input image element.

13. The non-transitory computer-readable medium of claim 8, wherein determining a perturbation to be applied to the identified target correlithm object comprises:

computing a ratio of the closest determined n-dimensional distance to a total number of pixels in the input image element;

determining a number of bits in the identified target correlithm object to be perturbed by applying the computed ratio to a total number of bits in the identified target correlithm object; and changing the binary value for each of the determined number of bits in the identified target correlithm object.

14. A method for emulating image mapping in a correlithm object processing system, comprising:

storing a correlithm object mapping table that comprises a plurality of source image elements and a plurality of corresponding target correlithm objects, each of the plurality of source image elements comprising an n-pixel array of binary values, each of the plurality of corresponding target correlithm objects comprising an m-bit digital word of binary values;

receiving an input image element comprising an n-pixel array of binary values;

determining n-dimensional distances between the input image element and each of the plurality of source image elements, wherein the determined n-dimensional distances are based on differences between the binary values representing the input image element and the binary values representing each source image element;

identifying a source image element with the closest determined n-dimensional distance to the input image element;

determining a deviation between the input image element and the identified source image element based on the closest determined n-dimensional distance;

determining whether the deviation is within a predetermined tolerance;

in response to determining that the deviation is within the predetermined tolerance, identifying a target correlithm object corresponding to the identified source image;

determining a perturbation to be applied to the identified target correlithm object based on the determined deviation; and generating a perturbed correlithm object by applying the determined perturbation to the identified target correlithm object.

15. The method of claim 14, wherein the n-dimensional distance comprises Hamming distance.

16. The method of claim 14, wherein determining n-dimensional distances between the input image element and each of the plurality of source image elements comprises:

for each of the plurality of source image elements, determining a number of pixels that differ between the input image element and the source image element.

17. The method of claim 14, wherein the deviation is determined as the determined n-dimensional distance.

18. The method of claim 14, wherein the predetermined tolerance is determined as a core distance for the input image, wherein the core distance is determined based on a standard deviation with respect to the input image element.

19. The method of claim 18, wherein the standard deviation is determined based on a total number of pixels in the input image element.

20. The method of claim 14, wherein determining a perturbation to be applied to the identified target correlithm object comprises:

computing a ratio of the closest determined n-dimensional distance to a total number of pixels in the input image element;

determining a number of bits in the identified target correlithm object to be perturbed by applying the computed ratio to a total number of bits in the identified target correlithm object; and changing the binary value for each of the determined number of bits in the identified target correlithm object.

\* \* \* \* \*